(12) United States Patent
Prust

(10) Patent No.: US 12,599,996 B2
(45) Date of Patent: Apr. 14, 2026

(54) MULTI-SPINDLE MACHINE TOOL

(71) Applicant: Index-Werke GmbH & Co. KG Hahn & Tessky, Esslingen (DE)

(72) Inventor: Dirk Prust, Esslingen (DE)

(73) Assignee: Index-Werke GmbH & Co. KG Hahn & Tessky (DE)

( * ) Notice: Subject to any disclaimer, the term of this patent is extended or adjusted under 35 U.S.C. 154(b) by 525 days.

(21) Appl. No.: 18/068,583

(22) Filed: Dec. 20, 2022

(65) Prior Publication Data

US 2023/0201983 A1 Jun. 29, 2023

(30) Foreign Application Priority Data

Dec. 23, 2021 (DE) .......................... 102021134601.0
May 10, 2022 (DE) .......................... 102022111683.2

(51) Int. Cl.
*B23Q 3/155* (2006.01)
*B23Q 7/04* (2006.01)
B23Q 3/12 (2006.01)

(52) U.S. Cl.
CPC ....... *B23Q 3/15513* (2013.01); *B23Q 3/1554* (2013.01); *B23Q 3/15546* (2013.01); *B23Q 3/15553* (2013.01); *B23Q 7/046* (2013.01); *B23Q 3/12* (2013.01); *B23Q 3/15503* (2016.11);
(Continued)

(58) Field of Classification Search
CPC .............. B23Q 3/15513; B23Q 3/1554; B23Q 3/15546; B23Q 3/15553; B23Q 7/046;

B23Q 3/12; B23Q 3/15503; B23Q 3/15534; B23Q 2003/155404; B23Q 2039/008; B23Q 3/155; B23Q 37/00; B23B 31/265; B23B 9/02
See application file for complete search history.

(56) References Cited

U.S. PATENT DOCUMENTS 3,173,204 A * 3/1965 Anthony ............ B23Q 3/15546
483/8
3,423,812 A 1/1969 Spur
(Continued)

FOREIGN PATENT DOCUMENTS

DE 1502031 B2 7/1975
DE 102007018710 A1 10/2008
(Continued)

*Primary Examiner* — Ryan J. Walters
(74) *Attorney, Agent, or Firm* — Reinhart Boerner Van Deuren P.C.

(57) ABSTRACT

In order to configure a multi-spindle machine tool comprising a machine frame, a spindle drum arranged on the machine frame to be rotatable about a spindle drum axis and having a plurality of workpiece spindles, each of which is provided with a workpiece receptacle for a workpiece that is to be machined in a working area, a plurality of tool carriers arranged in the working area, in particular associated with individual spindle stations, and each having a tool holder receptacle into which a tool holder is insertable, as well as a machine control system for controlling the machine tool to be more efficient, it is proposed that a handling apparatus is arranged on the machine frame, that with the handling device, also controlled by the machine control system, at least one tool holder is insertable into at least one of the tool holder receptacles and/or removable therefrom.

44 Claims, 20 Drawing Sheets

(52) U.S. Cl.
CPC ................... *B23Q 3/15534* (2016.11); *B23Q 2003/155404* (2016.11)

(56) References Cited

U.S. PATENT DOCUMENTS

| | | | | |
|---|---|---|---|---|
| 4,922,591 A * | 5/1990 | Campbell | .......... | B23Q 3/15546 |
| | | | | 483/902 |
| 5,046,014 A * | 9/1991 | Anjo | ............... | G05B 19/40938 |
| | | | | 483/9 |
| 5,131,136 A * | 7/1992 | Uchida | .................. | B23Q 1/012 |
| | | | | 483/46 |
| 5,486,151 A | 1/1996 | Bergmann et al. | | |
| 7,338,419 B2 | 3/2008 | Storch et al. | | |
| 9,724,760 B2 * | 8/2017 | Kawasumi | .............. | B23B 3/167 |
| 10,737,362 B2 * | 8/2020 | Persico | .................. | B23B 13/04 |
| 2010/0210433 A1 | 8/2010 | Grossman | | |
| 2017/0326701 A1 | 11/2017 | Morimura | | |
| 2020/0269368 A1 | 8/2020 | Schumacher | | |

FOREIGN PATENT DOCUMENTS

| | | | |
|---|---|---|---|
| DE | 102017110029 A1 | 11/2017 |
| DE | 102019104686 A1 | 8/2020 |
| EP | 1654091 B1 | 1/2011 |
| EP | 3417995 A1 | 12/2018 |
| WO | WO 9305926 A1 | 4/1993 |

* cited by examiner

MULTI-SPINDLE MACHINE TOOL

CROSS-REFERENCE TO RELATED PATENT APPLICATIONS

The present disclosure relates to the subject matter disclosed in German application number 10 2021 134 601.0 of Dec. 23, 2021 and German application number 10 2022 111 683.2 of May 10, 2022, which are incorporated herein by reference in their entirety and for all purposes.

BACKGROUND OF THE INVENTION

The invention relates to a multi-spindle machine tool comprising a machine frame, a spindle drum arranged on the machine frame to be rotatable about a spindle drum axis and having a plurality of workpiece spindles, each of which is provided with a workpiece receptacle for a workpiece that is to be machined in a working area, a plurality of tool carriers arranged in the working area, in particular associated with individual spindle stations, and each having a tool holder receptacle into which a tool holder is insertable, as well as a machine control system for controlling the machine tool.

Such multi-spindle machine tools are known from the prior art.

In accordance with an embodiment of the invention, the machining of the workpieces with a multi-spindle machine tool of this type is configured to be more efficient.

SUMMARY OF THE INVENTION

In accordance with an embodiment of the invention, provision is made in a machine tool of the aforementioned type that a handling apparatus is arranged on the machine frame, that with the handling apparatus, also controlled by the machine control system, at least one tool holder is insertable into at least one of the tool holder receptacles and/or is removable therefrom.

The advantage of the solution according to the invention lies in that the tooling or retooling of a multi-spindle machine tool of this type can be configured to be more efficient and, in particular, the possibility also exists for exchanging tools that have exceeded their service life or for exchanging defective tools quickly.

A handling apparatus for the machine tool according to the invention can be, for example, a handling apparatus moving the tool holder in one direction as far as the tool holder receptacle.

A particularly advantageous solution provides that the handling apparatus is configured as a multi-axis handling apparatus.

A multi-axis handling apparatus of this type enables the movement sequence to be optimized in order to be able to insert the respective tool holder efficiently into the respective tool holder receptacle.

For example, a multi-axis handling apparatus of this type is configured so that it has at least five, or better, six axes.

It is particularly advantageous if the multi-axis handling apparatus is a pivot-arm handling apparatus.

Preferably, the handling apparatus is configured so that it can access a plurality of tool holder receptacles for inserting and/or removing a tool holder.

It is particularly favorable if the handling apparatus is configured so that it can access a plurality of tool holder receptacles associated with a plurality of spindle stations for inserting and/or removing the tool holder.

With respect also to the movement capabilities of the handling apparatus, a great variety of solutions are conceivable.

For example, it is conceivable that the handling apparatus travels transversely to the tool spindle axes for inserting and/or removing the respective tool holder in the working area.

Another advantageous solution provides that the handling apparatus travels with a movement component parallel to the workpiece spindle axes when inserting and/or removing the respective tool holder in the working area.

This has the advantage that access to the tool holder receptacles of a plurality of tool carriers can thereby take place in an advantageous manner and also, in particular, at high speed.

In this regard, it is preferably provided that the handling apparatus travels in the working area with a movement component parallel to the workpiece spindle axes when inserting and/or removing the respective tool holder in order to be able to access the greatest possible range of different tool holder receptacles in the shortest possible time.

A particularly advantageous constructional solution provides that the handling apparatus travels in from a side of the working area facing away from the spindle drum into the working area for inserting and/or removing the respective tool holder.

With respect to the arrangement of the tool holder receptacle, no further details have so far been given.

An advantageous solution provides that the tool carrier has a tool carriage which carries the tool holder receptacle and is controlled by the machine control system.

In particular, it is therein provided that the tool carriage is movable at least in an X-machining direction, but preferably also in further machining directions, for example a Z-machining direction, relative to the workpiece spindle, in order to be able to machine the workpiece optimally.

With respect to the insertion of the tool holder into the tool holder receptacle, a great variety of possibilities is conceivable.

An advantageous solution provides that the tool holder is insertable into the tool holder receptacle in an inserting direction extending approximately parallel to a workpiece spindle axis of the respective workpiece spindle.

Alternatively, another solution provides that the tool holder is insertable into the tool holder receptacle in an inserting direction extending transversely to a workpiece spindle axis of the respective workpiece spindle, said inserting direction extending, in particular, away from the workpiece spindle axis.

In order to be able to fix the tool holder in the tool holder receptacle after the insertion and to be able to release the fixing again before the removal, it is preferably provided that the machine control system controls a fixing device for fixing the tool holder in the tool holder receptacle such that with this fixing device, after the insertion of the tool holder into the tool holder receptacle, clamping of the tool holder in the tool holder receptacle and, for removal of the tool holder from the tool holder receptacle, a releasing of the tool holder takes place.

It is further suitably provided that to form the fixing device, the tool holder receptacle and the tool holder have cooperating positively-locking elements which can be brought into engagement when the tool holder is inserted into the tool holder receptacle.

For this purpose, it is provided for example, that the tool carrier has a tool carriage with a fixing receptacle extending thereinto into which a fixing body of the tool holder is insertable by moving it in an inserting direction and, in the inserted state, is fastenable by fixing it in the fixing receptacle with a positively-locking element.

Suitably, the positively-locking element is therein configured as a fixing wedge body which is movable in the tool carriage in a movement direction extending transversely to the inserting direction between a releasing position and a fixing position and in the fixing position, the fixing wedge body cooperates with a wedge receptacle of the fixing body.

In an easily realized case, it is provided that the fixing wedge body is guided in a linearly movable manner in the tool carriage and acts with a wedge face on a wedge face of the wedge receptacle of the fixing body.

For example, the fixing wedge body is movably guided in a guide channel of the tool carriage.

It is further preferably provided that the fixing wedge body is movable between the fixing position and the releasing position by way of a drive controlled by the machine control system.

Another advantageous solution provides that the tool carrier has a tool carriage with a tool holder receptacle into which the tool holder is insertable in an inserting direction which lies, in particular, in a plane extending transversely to the workpiece spindle axis.

A further suitable solution provides that the tool holder has a hollow-shaft cone which is insertable into the tool holder receptacle which has a conical receptacle.

A suitable solution for fixing the hollow-shaft cone herein provides that the hollow-shaft cone has a clamping contour with which a clamping unit of the tool holder receptacle cooperates.

It is herein particularly suitable if the clamping unit can be acted upon by a clamping actuating unit controlled by the machine control system in the direction of its clamping position in which it clampingly fixes the hollow-shaft cone.

For fixing the hollow-shaft cone, it is particularly favorable if, in the clamping position, the clamping unit draws the hollow-shaft cone in the direction of the conical axis into the conical receptacle and presses it radially to the conical axis against the conical receptacle in order thereby to achieve a sufficiently stable fixing of the hollow-shaft cone in the conical receptacle.

In order to be able also to use powered tools in the machine tool according to the invention, an advantageous solution provides that a tool drive controlled by the machine control system is arranged stationary on the tool carriage, with which tool drive a tool spindle which is rotatably mounted in the tool holder and receives the tool can be driven.

In order always to have the possibility to exchange the tool holder, it is preferably provided that the tool drive can be coupled by means of a coupling to the tool spindle.

It is further advantageous if the coupling has coupling elements configured in this manner so that by inserting the tool holder into the tool holder receptacle they can be brought into engagement in the tool holder receptacle so that no separate action is required to couple the tool drive to the tool spindle, but rather the coupling takes place by inserting the tool holder into the tool holder receptacle and, by removing the tool holder, advantageously a decoupling of the tool spindle from the tool drive also takes place.

This can advantageously be realized in that one of the coupling elements has a receptacle extending transversely to the rotation axis and the other coupling element has an engagement for the receptacle extending transversely to the rotation axis, so that they can be brought into and out of engagement by means of a linear movement.

In order to ensure that the rotary position of the tool spindle is maintained when the tool holder is removed from the tool holder receptacle, specifically until the tool holder is re-inserted into the tool holder receptacle, it is preferably provided that the tool holder is provided with a rotary fixing for rotationally fixed securing of the rotatable tool spindle.

In principle, it would be possible to actuate the rotary fixing by means of the machine control system and thus to release or remove the fixing of the tool spindle under control by the machine control system.

However, a particularly simple solution provides that, with the tool holder fixed in the tool holder receptacle, the rotary fixing is automatically in an inactive position and on release of the fixed tool holder, automatically transfers into an active rotation-fixing position.

Furthermore, it is provided according to the invention that, by means of the machine control system, the handling apparatus inserts the tool holder into a tool holder magazine or removes it therefrom.

The possibility therefore exists for placing tool holders that are to be removed in a defined position in the tool holder magazine and also for placing tool holders that are to be utilized identifiably in the tool holder magazine and for grasping them for use by means of the tool holder gripper.

For example, for this purpose, the tool holder magazine is configured such that it has a magazine element for receiving the tool holders, said magazine element being movable by a drive and that the drive is controllably actuatable by the machine control system.

Furthermore, it is preferably provided that the tool holder magazine is arranged outside the working area.

It is still better if the tool holder magazine is arranged outside a machine hood and, in particular, protected by a covering.

In principle, the spindle axes of the workpiece spindles of the multi-spindle machine tool could be oriented transversely to the spindle drum axis or obliquely to the spindle drum axis.

A particularly advantageous solution provides, however, that the spindle axes of the workpiece spindles are oriented parallel to the spindle drum axis.

Thereby, the orientation of the workpiece spindles to the tool carriers is simplified.

Furthermore, in a multi-spindle machine tool, it is preferably provided that the individual workpiece spindles of the spindle drum are movable by rotation, controlled by the machine control system, of the spindle drum about the spindle drum axis into individual defined spindle stations which are provided statically relative to the machine frame and that tool carriers are associated with the individual spindle stations, so that a workpiece can be machined in a workpiece spindle standing in the corresponding spindle station, by way of the at least one tool carrier associated with this spindle station by means of its tool or by way of a plurality of tool carriers associated with this spindle station by means of their tools.

Preferably, the tool carriers are configured such that the at least one tool carrier has a tool carriage system which carries the tool holder receptacle and is controlled by the machine control system.

Preferably, the tool carriage system is therein configured such that it has at least one tool carriage which is movable in an X-machining direction relative to the workpiece spindle and carries the tool receptacle.

Alternatively thereto, this tool carriage is also movable with the tool receptacle in at least one further axis, for example in the direction of the Z-axis, that is, parallel to the workpiece spindle axis of the workpiece spindle standing in this spindle station.

The machine tool according to the invention can be used particularly advantageously if the handling apparatus has a gripper receptacle by means of which the handling apparatus can receive a tool holder gripper which is controlled by the machine control system, so that the handling apparatus can be used in a flexible manner.

In this case it is provided, in particular if a plurality of tool holder grippers are provided, that the tool holder grippers are placeable in a gripper store with workpiece holder gripper receptacles.

In order not to restrict the working area, it is preferably provided that the gripper store is arranged outside the working area.

Furthermore, it is preferably provided that the gripper store is arranged outside a machine hood and is, in particular, provided with a covering.

In order to be able to exchange both workpieces and also tools, it is preferably provided that the machine control system detects whether the tool holder gripper is received in the gripper receptacle of the handling apparatus.

This is possible, for example, in that the machine control system detects a code on the tool holder gripper.

A code of this type can be recognized either by means of electric contacts or by means of an optical pattern.

A code of this type can be, for example, an optical code or an electrical or electronic or clip code.

Alternatively or additionally, however, it is also possible that the machine control system identifies the tool holder gripper on the basis of its position in the gripper store and can thus detect by means of the position in the gripper store whether it is the intended tool holder gripper.

In connection with the solution so far, it has been assumed merely that the handling apparatus carries out an insertion and/or removal of the tool holder in a tool holder receptacle.

An advantageous development of the multi-spindle machine tool according to the invention provides that it has a handling apparatus arranged on the machine frame, with which, controlled by the machine control system, workpieces are insertable into and/or removable from at least one of the workpiece spindles.

It is particularly favorable if by means of the handling apparatus, workpieces are insertable into and/or removable from a plurality of workpiece spindles.

This handling apparatus is preferably also configured as a multi-axis handling apparatus.

It is particularly favorable if, controlled by the machine control system, by means of a handling apparatus, workpieces are insertable into at least one of the workpiece spindles and/or are removable therefrom and also by means of this handling apparatus, at least one tool holder is insertable into the at least one tool holder receptacle and removable therefrom.

In this case, it is suitably provided that the handling apparatus has a gripper receptacle by means of which the handling apparatus can place either a workpiece gripper or a tool holder gripper in a workpiece gripper receptacle and/or a tool holder gripper receptacle of a gripper store.

Preferably, this gripper store is therein arranged outside the working area.

However, the possibility also exists for arranging this gripper store outside the machine hood and, in particular, to provide a separate protection therefor.

In particular with this solution, it is favorable if the machine control system detects whether the workpiece gripper or the tool holder gripper is received in the gripper receptacle of the handling apparatus.

It is therein preferable also, as provided in relation to the tool holder grippers, that machine control system detects a code on the workpiece gripper.

Alternatively to a code, it is provided that the machine control system detects the workpiece gripper on the basis of its position in the gripper store.

A particularly advantageous solution provides that the same handling apparatus can receive and also control both the workpiece gripper and also the tool holder gripper in the gripper receptacle.

In particular, control of the workpiece gripper and the tool holder gripper is also performed by the machine control system.

The invention further relates to a method for operating a machine tool according to one or more of the features described above, wherein the machine control system controls the handling apparatus, in particular using a program or program code, such that the handling apparatus removes at least one tool holder from a tool holder magazine and inserts it into at least one tool holder receptacle of the at least one tool carrier.

Alternatively, it is preferably provided according to an advantageous development of the method according to the invention that the machine control system controls the handling apparatus, in particular using a program or program code, such that said handling apparatus removes a tool holder from a tool holder receptacle and places it, for example, in a tool holder magazine.

The advantage of the solution according to the invention is therefore that, with this handling apparatus, at least an insertion and/or removal of a tool holder into or out of a tool carrier can be carried out.

In order to be able to operate with an interchangeable tool holder gripper, it is preferably provided that the machine control system controls the handling apparatus, in particular using a program or program code, such that said handling apparatus receives a tool holder gripper with its gripper receptacle.

This solution has the advantage that thereby, where relevant, a plurality of tool holder grippers can be used in a simple manner.

In order to recognize that a tool holder gripper is received, in particular also whether the tool holder gripper is reliably received, it is preferably provided that the machine control system detects, in particular using a program or program code, whether a tool holder gripper is received in the gripper receptacle.

In particular, if two tool holder grippers are used, it is suitable if the machine control system controls the handling apparatus, in particular using a program or program code, in such a way that, in order to change between a first tool holder gripper and a second tool holder gripper, said handling apparatus places one thereof in a gripper store and removes the other from the gripper store.

In order to be able to detect the tool holder gripper as such, it is preferably provided that, by means of the handling apparatus, the machine control system detects a code on the tool holder gripper, in particular using a program or program code.

In this way, firstly the tool holder gripper is identifiable as such and, secondly, it is also identifiable whether the tool holder gripper is safely held on the handling apparatus.

Furthermore, it is suitably provided that, on the basis of the position of the respective holder gripper in the gripper store the machine control system identifies said holder gripper, in particular using a program or program code.

Furthermore, it is preferably provided that the machine control system controls the handling apparatus, in particular using a program or program code, such that said handling apparatus inserts at least one tool holder into a tool holder magazine or removes it therefrom.

This includes, in particular, the machine control system being capable, for example by means of the handling apparatus, of identifying or storing the individual tool holders in the tool holder magazine, in which position of the tool holder magazine which tool holder is stored and thereby of identifying the respective tool holder.

For this purpose, it is provided in particular that the machine control system moves a magazine element of the tool holder magazine by means of a drive, in particular using a program or program code, such that by means of the handling apparatus, access to a specified tool holder in the magazine element is possible.

With this solution, the possibility exists, firstly, to store a large number of tool holders in the tool holder magazine and furthermore then again to recognize the tool holder that is to be removed from the tool holder magazine, in order to insert it into a tool holder receptacle provided for it of a tool carrier of the machine tool.

Furthermore, in order to be able to exchange the tool holder as far as possible without collisions, it is provided that the machine control system moves a tool carriage system of the tool carrier, in particular using a program or program code, such that its tool holder receptacle stands in a changing position for exchanging the tool holder.

Such a changing position of the tool holder receptacle is, for example, a position in which the tool of the tool holder placed therein is not to be used on the workpiece.

This solution has the advantage that the changing position can be specified such that thereby collisions during the exchanging of a tool holder from the tool holder receptacle can be prevented.

For example, it is possible with this solution to select the changing position such that collisions of the tool holder with a workpiece still received in a workpiece spindle or with tools of other, particularly adjoining, tool holders can be prevented.

In the simplest case, this has the result that the changing position of the tool holder receptacle is selected to be at the greatest possible spacing from the closest workpiece spindle.

Suitably for this purpose, it is provided that the machine control system controls the handling apparatus, in particular using a program or program code, such that said handling apparatus inserts a tool holder into the tool holder receptacle standing in the changing position or removes it therefrom and consequently collisions during exchanging of the tool holder can, with a high probability, be prevented.

A further suitable solution provides that the machine control system controls the handling apparatus, in particular using a program or program code, such that said handling apparatus inserts the tool holder into the tool holder receptacle in an inserting direction approximately parallel to a workpiece spindle axis of the respective workpiece spindle or removes it from this tool holder receptacle opposingly to this inserting direction.

With such an inserting direction of the tool holder receptacle, there exists the great advantage that thereby, with a high probability, a collision-free exchanging of the tool holder with adjoining tool holders and workpieces is possible and also that dropping of chips causes no damage.

Alternatively, the possibility exists that the machine control system controls the handling apparatus, in particular using a program or program code, such that said handling apparatus inserts the tool holder into the tool holder receptacle in an inserting direction extending transversely to a workpiece spindle axis of the respective workpiece spindle or removes it opposingly to this direction.

This solution has the disadvantage that thereby a greater spacing is to be maintained between the changing position and a workpiece in the closest workpiece spindle, while given a complex construction, it has the advantage that in the working area, an accessway to the changing position extending parallel to the spindle axis is not required.

A further advantageous solution provides that the machine control system actuates a fixing device of the tool holder receptacle, in particular using a program or program code, such that said fixing device fixes a tool holder inserted into the tool holder receptacle or releases a tool holder to be removed from the tool holder receptacle.

Thereby with the machine control system, the fixing of the tool holder, after the insertion thereof, in the tool holder receptacle and the maintenance of the fixing until the exchanging of the tool holder can also be controlled and conversely, for exchanging, the fixing can easily be released.

Furthermore, it is preferably provided that the machine control system actuates a tool drive for a tool spindle rotatably mounted in the tool holder, in particular using a program or program code, such that said tool drive stands and, in particular, remains standing in a defined rotary position before the insertion or after the removal of the tool holder into or from the tool holder receptacle, in order to permit an uncoupling and a renewed coupling of a tool spindle of the tool holder also standing in a defined rotary position during exchanging thereof.

This means that the tool drive is actuated, in particular, so that a coupling element connecting it to the tool spindle remains in the position in which a uncoupling of the tool spindle of the tool holder takes place merely by removing the tool holder and also, in this rotary position of the coupling element of the tool drive, a coupling to the coupling element of the tool spindle can again take place merely by inserting the tool holder.

In this case, in particular, it is provided that the tool holder has a rotary fixing which provides that the tool spindle also remains in the position in which removal of the tool holder from the tool holder receptacle takes place and this rotary position is maintained for as long as a coupling of the tool spindle to the tool drive takes place again on insertion of the tool holder.

A further advantageous embodiment of the method according to the invention provides that the machine control system controls the handling apparatus, in particular using a program or program code, such that, during the changing of a tool holder, it moves the tool holder gripper, in particular together with this tool holder, through the working area to the tool holder receptacle, standing in particular in the changing position, along a stored tool changing path.

This stored tool changing path is also to be selected so that the tool holder gripper moves together with the tool holder without collisions through all the components of the working area and also without collisions with other tools or tool holders or tool carriers or workpiece spindles with or without workpieces into the provided tool holder receptacle and can be fixed therein.

Such a tool changing path can, in principle, also be specified freely programmed and stored in advance.

Another advantageous solution provides that the machine control system captures and stores, in particular using a program or program code, a manually controlled or manually specified movement of the handling apparatus with the tool holder gripper and moves the tool holder gripper by driving the handling apparatus, in accordance with this stored tool changing path, to this tool holder receptacle.

In this case also, for each of the tool holder receptacles into which a tool is to be exchanged, a tool changing path of this type is to be specified and stored so that it is then available for the machine control system.

In connection with the above statements regarding the method according to the invention, only the tool change has been described.

A further advantageous solution provides that the machine control system controls a or the handling apparatus, in particular using a program or program code, such that the handling apparatus removes workpieces at least from a workpiece spindle and passes them to a workpiece feed and/or removal apparatus.

Furthermore, it is advantageously provided that, in particular using a program or program code, the machine control system deactivates a workpiece clamping apparatus of the workpiece receptacle of the respective workpiece spindle for removing a workpiece or after the insertion of a workpiece, activates it for clamping the workpiece, that is, that also at a suitable time, the clamping of a workpiece can be activated or deactivated by the machine control system in order to fix the workpiece after insertion or to be able to remove it for exchanging.

A further advantageous solution provides that the machine control system controls the handling apparatus, in particular using a program or program code, such that the handling apparatus moves the workpiece gripper along a defined specified workpiece changing path through the working area to the workpiece spindle.

Thereby, in particular, the workpiece changing path is defined in such a way that it should be configured, and extend through the working area to the respective workpiece spindle, so that neither the tool gripped by the workpiece gripper nor the workpiece gripper nor the handling apparatus collides with any component in the working area or with a tool or tool carrier.

A workpiece changing path of this type can be specified as such in advance as a program or program code, depending upon the equipping of the machine tool and, in particular, also taking account of all the tools and tool holders available at the time of the tool change, or also of other workpieces.

Another advantageous solution provides that the machine control system captures and stores, in particular using a program or program code, a manually controlled or manually specified movement of the handling apparatus with the workpiece gripper through the working area and to the workpiece spindle as the workpiece changing path, stores it and subsequently utilizes it as the stored workpiece changing path at least for the removal of a workpiece from this respective workpiece spindle.

However, this means that for the operation of the machine tool, for the respective workpiece spindle in the spindle station intended for exchanging, a workpiece changing path of this type must be specified and stored.

The handling apparatus for the workpiece change could be, in principle, a handling apparatus separate from the handling apparatus for the tool change.

However, it is particularly suitable if the same handling apparatus is utilized both for the tool change and also for the workpiece change.

A particularly advantageous solution also for exchanging the workpiece provides that the machine control system controls the handling apparatus, in particular using a program or program code, such that said handling apparatus carries out a change with its gripper receptacle, between a workpiece gripper and a tool holder gripper or between two workpiece grippers or between two tool holder grippers.

It is thereby ensured in a simple manner that the handling apparatus can advantageously operate with a workpiece gripper that is suitable for workpieces and a tool holder gripper suitable for the tool holder and can reliably grip both the workpiece and also the tool holder.

A further advantageous solution provides that the machine control system detects, in particular using a program or program code, whether a workpiece gripper, possibly which workpiece gripper, or a tool holder gripper, possibly which tool holder gripper, is received in the gripper receptacle.

The great advantage is thereby achieved that the machine control system is able to recognize whether a workpiece gripper or a tool holder gripper is present in the gripper receptacle and can be utilized.

It is particularly suitable therein if the machine control system controls the handling apparatus, in particular using a program or program code, in such a way that, in order to change between the workpiece gripper and the tool holder gripper or between two workpiece grippers or between two tool holder grippers, said handling apparatus places one thereof in a gripper store and removes the other thereof from the gripper store.

A change between a workpiece gripper and a tool holder gripper can thereby be realized in a simple and reproducible manner.

In order to recognize whether a workpiece gripper or a tool holder gripper is received in the handling apparatus, it is preferably provided that the machine control system detects, by means of the handling apparatus, in particular using a program or program code, a code on the workpiece gripper and on the tool gripper.

Alternatively or additionally, in a further advantageous solution it is provided that, on the basis of the position of the workpiece gripper and the tool holder gripper in the gripper store, in particular using a program or program code, the machine control system identifies them.

This means that the handling apparatus places the workpiece gripper and the tool holder gripper in different positions, in particular, in gripper receptacles provided for them and is thus able to recognize, from the position from which the respective gripper is removed, which of the grippers is received by the gripper receptacle of the handling apparatus.

The description above of solutions according to the invention thus comprises, in particular, the different feature combinations defined by the following sequentially numbered embodiments:

1. A multi-spindle machine tool comprising a machine frame (10), a spindle drum (16) arranged on the machine frame (10) to be rotatable about a spindle drum axis (20) and having a plurality of workpiece spindles (22), each of which is provided with a workpiece receptacle (42) for a workpiece (W) that is to be machined in a working area (50), a plurality of tool carriers (28) arranged in the working area (50), in particular associated with individual spindle stations, and each having a tool holder receptacle (92) into which a tool holder (90) is insertable, as well as a machine control system (80) for controlling the machine tool, wherein a handling apparatus (60) is arranged on the machine frame (10), wherein with the handling apparatus (60), also controlled by the machine control system (80), at least one tool holder (90) is insertable into at least one of the tool holder receptacles (92) and/or is removable therefrom.

2. The machine tool according to embodiment 1, wherein the handling apparatus (60) is configured as a multi-axis handling apparatus (60).

3. The machine tool according to one of the preceding embodiments, wherein the handling apparatus (60) is configured so that it can access a plurality of tool holder receptacles (92) for inserting and/or removing a tool holder (90).

4. The machine tool according to one of the preceding embodiments, wherein the handling apparatus (60) is configured so that it can access tool holder receptacles (92) associated with a plurality of spindle stations for inserting and/or removing a tool holder (90).

5. The machine tool according to one of the preceding embodiments, wherein the handling apparatus (60) travels with a movement component parallel to the workpiece spindle axes when inserting and/or removing the respective tool holder in the working area (50).

6. The machine tool according to one of the preceding embodiments, wherein the handling apparatus (60) travels in from a side of the working area (50) facing away from the spindle drum (16) into the working area (50) for inserting and/or removing the respective tool holder (90).

7. The machine tool according to one of the preceding embodiments, wherein the tool holder (90) is insertable into the respective tool holder receptacle (92) in an inserting direction (178) extending approximately parallel to the spindle drum axis (20).

8. The machine tool according to one of the preceding embodiments, wherein the tool holder (90) is insertable into the tool holder receptacle (92) in an inserting direction (288) extending transversely to the spindle drum axis (20), said inserting direction extending, in particular, away from the spindle drum axis (20).

9. The machine tool according to one of the preceding embodiments, wherein a fixing device (180) for fixing the tool holder (90) in the tool holder receptacle (92) is controllable with the machine control system (80).

10. The machine tool according to one of the preceding embodiments, wherein to form the fixing device (180), the tool holder receptacle (92) and the tool holder (90) have cooperating positively-locking elements (176, 182, 184, 292, 300), which are configured to be brought into engagement in a positively-locking manner on insertion of the tool holder (90) into the tool holder receptacle (92).

11. The machine tool according to embodiment 10, wherein the tool carrier (28) has a tool carriage (156) with a fixing receptacle (174) extending thereinto into which a fixing body (176) of the tool holder (160) is insertable by moving it in an inserting direction (178) and, in an inserted state, is fastenable by fixing it in the fixing receptacle (174) by way of a positively-locking element (182).

12. The machine tool according to embodiment 11, wherein the positively-locking element is a fixing wedge body (182) which is movable in the tool carriage (156) in a movement direction extending transversely to the inserting direction (178) between a releasing position and a fixing position and in the fixing position, the fixing wedge body (182) cooperates with a wedge receptacle (184) of the fixing body (176).

13. The machine tool according to embodiment 12, wherein the fixing wedge body (182) is guided in a linearly movable manner in the tool carriage (156) and acts with a wedge face (186) on a wedge face (188) of the wedge receptacle (184) of the fixing body (176).

14. The machine tool according to embodiment 13, wherein the fixing wedge body (182) is movable between the fixing position and the releasing position by means of a drive (200) controlled by the machine control system (80).

15. The machine tool according to one of embodiments 1 to 11, wherein the tool carrier (28) has a tool carriage (156) with a tool holder receptacle (250) into which the tool holder (260, 370) is insertable in an inserting direction (288) which lies in a plane extending transversely to the workpiece spindle axis (24).

16. The machine tool according to embodiment 15, wherein the tool holder (260, 370) has a hollow-shaft cone (274) which is insertable into the tool holder receptacle (250) having a conical receptacle (274).

17. The machine tool according to embodiment 16, wherein the hollow-shaft cone (274) has a clamping contour (292) with which a clamping unit (300) of the tool holder receptacle (250) cooperates.

18. The machine tool according to embodiment 17, wherein the clamping unit (300) is configured to be acted upon by a clamping actuating unit (320), controlled by the machine control system (80), in the direction of its clamping position in which it clampingly fixes the hollow-shaft cone (274).

19. The machine tool according to one of embodiments 16 to 18, wherein in the clamping position, the clamping unit (300) draws the hollow-shaft cone (274) in the direction of the conical axis (286) into the conical receptacle (282) and presses it radially to the conical axis (286) against the conical receptacle (282).

20. The machine tool according to one of the preceding embodiments, wherein arranged stationary on the tool carriage (30) is a tool drive (220, 350) controlled by the machine control system (80), with which a tool spindle (218, 266) which is rotatably mounted in the tool holder (90) is drivable.

21. The machine tool according to embodiment 20, wherein the tool drive (230, 350) is configured to be coupled by means of a coupling (224, 340) to the tool spindle (218, 266).

22. The machine tool according to embodiment 21, wherein the coupling (224, 340) has coupling elements configured to be brought in to engagement when the tool holder (90) is inserted into the tool holder receptacle (92).

23. The machine tool according to embodiment 22, wherein one of the coupling elements (226, 338) has a receptacle extending transversely to the rotation axis and the other of the coupling elements (228, 336) has an engagement for the receptacle extending transversely to the rotation axis.

24. The machine tool according to one of embodiments 20 to 23, wherein the tool holder (90) is provided with a rotary fixing (234, 362) for rotationally fixed securing of the rotatable tool spindle (216, 266).

25. The machine tool according to embodiment 24, wherein with the tool holder (90) fixed in the tool holder receptacle (92), the rotary fixing (234, 362) is automatically in an inactive position and on release of the fixed tool holder, automatically transfers into an active rotation-fixing position.

26. The machine tool according to one of the preceding embodiments, wherein with the handling apparatus (60), controlled by the machine control system (80), the tool holders (90) are insertable into a tool holder magazine (96) or are removable therefrom.

27. The machine tool according to embodiment 26, wherein the tool holder magazine (96) has a magazine element (95) for receiving the tool holders (90), said magazine element being movable by way of a drive (97), and the drive (97) is controllable by the machine control system.

28. The machine tool according to embodiment 26 or 27, wherein the tool holder magazine (96) is arranged outside the working area (50).

29. The machine tool according to one of the preceding embodiments, wherein the spindle axes (24) of the workpiece spindles (22) are oriented parallel to the spindle drum axis (20).

30. The machine tool according to one of the preceding embodiments, wherein the tool carriers (28) are associated with spindle stations (26) in which the workpiece spindles (22) are positionable for machining the workpieces (W) held in the workpiece receptacles (42).

31. The machine tool according to one of the preceding embodiments, wherein the at least one tool carrier (28) has a tool carriage system (30) which carries the tool holder receptacle (92) and is controlled by the machine control system (80).

32. The machine tool according to embodiment 31, wherein the tool carriage system (30) has tool carriages movable at least in an X-machining direction relative to the workpiece spindle (22).

33. The machine tool according to one of the preceding embodiments, wherein the handling apparatus (60) has a gripper receptacle (66), by means of which the handling apparatus (60) can receive a tool holder gripper (98) which is controlled by the machine control system (80).

34. The machine tool according to embodiment 33, wherein the tool holder gripper (98) is placeable in a tool holder gripper receptacle (154) of a gripper store (100).

35. The machine tool according to embodiment 34, wherein the gripper store (100) is arranged outside the working area (50).

36. The machine tool according to one of embodiments 33 to 35, wherein the machine control system (80) detects whether the tool holder gripper (98) is received in the gripper receptacle (66) of the handling apparatus (60).

37. The machine tool according to embodiment 36, wherein the machine control system (80) detects a code on the tool holder gripper (98).

38. The machine tool according to one of embodiments 34 to 37, wherein the machine control system (80) detects the tool holder gripper (98) on the basis of its position in the gripper store (100).

39. The machine tool according to one of the preceding embodiments, wherein it has a handling apparatus (60) provided on the machine frame (10), with which handling apparatus, workpieces (W) are insertable, controlled by the machine control system (80), into at least one of the workpiece spindles (22) and/or are removable therefrom.

40. The machine tool according to embodiment 39, wherein the machine control system (80) controls the handling apparatus (60) during a workpiece change.

41. The machine tool according to embodiment 39 or 40, wherein the handling apparatus (60) has a gripper receptacle (66), by means of which the handling apparatus (60) can receive a workpiece gripper (68).

42. The machine tool according to embodiment 41, wherein the workpiece gripper (68) is placeable in a workpiece gripper receptacle (152) of a gripper store (100).

43. The machine tool according to embodiment 42, wherein the gripper store (100) is arranged outside the working area (50).

44. The machine tool according to one of embodiments 41 to 43, wherein the machine control system (80) detects whether the workpiece gripper (68) is received in the gripper receptacle (66) of the handling apparatus (60).

45. The machine tool according to embodiment 44, wherein the machine control system (80) detects a code on the workpiece gripper (68).

46. The machine tool according to one of the preceding embodiments, wherein the machine control system (80) detects the workpiece grippers (68) on the basis of its position in the gripper store (100).

47. A method for operating a machine tool according to one of the preceding embodiments, wherein the machine control system (80) controls the handling apparatus (60), in particular using a program or program code, such that the handling apparatus (60) removes at least one tool holder (90) from a tool holder magazine (96) and inserts it into at least one tool holder receptacle (92) of the at least one tool carrier (28) and/or removes a tool holder (90) from the tool holder receptacle (92) and places it in the tool holder magazine.

48. The method according to embodiment 47, wherein the machine control system (80) controls the handling apparatus (60), in particular using a program or program code, such that said handling apparatus receives a tool holder gripper (98) with its gripper receptacle (66).

49. The method according to embodiment 47 or 48, wherein the machine control system (80) detects, in particular using a program or program code, whether a tool holder gripper (98) is received in the gripper receptacle (66).

50. The method according to embodiment 49, wherein the machine control system (80) controls the handling apparatus (60), in particular using a program or program code, in such a way that, in order to change between a first tool holder gripper and a second tool holder gripper (98), said handling apparatus places one thereof in a gripper store (100) and removes the other from the gripper store (100).

51. The method according to one of embodiments 47 to 50, wherein the machine control system (80) detects by means of the handling apparatus (60), in particular using a program or program code, a code on the tool holder gripper (98).

52. The method according to one of embodiments 47 to 51, wherein on the basis of the position of the respective tool holder gripper (98) in the gripper store (100), in particular using a program or program code, the machine control system (80) identifies said tool holder gripper.

53. The method for operating a machine tool according to one of the preceding embodiments or according to one of embodiments 47 to 52, wherein the machine control system (80) controls the handling apparatus (60), in particular using a program or program code, such that said handling apparatus inserts at least one tool holder (90) into a tool holder magazine (96) or removes it therefrom.

54. The method according to embodiment 53, wherein the machine control system (80) moves a magazine element (95) of the tool holder magazine (96) by means of a drive (97), in particular using a program or program code, such that by means of the handling apparatus (60), an access to a defined tool holder (90) in the magazine element (95) is possible.

55. The method according to one of embodiments 47 to 54, wherein the machine control system (80) moves a tool carriage system (30) of the tool carrier (28), in particular using a program or program code, such that its tool holder receptacle (92) stands in a changing position for exchanging the tool holder (90).

56. The method according to embodiment 55, wherein the machine control system (80) controls the handling apparatus (60), in particular using a program or program code, such that said handling apparatus inserts a tool holder (90) into the tool holder receptacle (92) standing in the changing position or removes it therefrom.

57. The method according to one of embodiments 47 to 56, wherein the machine control system (80) controls the handling apparatus (60), in particular using a program or program code, such that said handling apparatus inserts the tool holder (90) into the tool holder receptacle (92) in an inserting direction (178) extending approximately parallel to a workpiece spindle axis (24) of the respective workpiece spindle (22) or removes it from said tool holder receptacle opposingly to this direction.

58. The method according to one of embodiments 47 to 57, wherein the machine control system (80) controls the handling apparatus (60), in particular using a program or program code, such that said handling apparatus inserts the tool holder (90) into the tool holder receptacle (92) in an inserting direction (288) extending transversely to a workpiece spindle axis (24) of the respective workpiece spindle (22) or removes it from said tool holder receptacle opposingly to this direction.

59. The method for operating a machine tool according to one of the preceding embodiments or according to one of embodiments 47 to 58, wherein the machine control system (80) actuates a fixing device (180) of the tool holder receptacle (92), in particular using a program or program code, such that said fixing device fixes a tool holder (90) inserted into the tool holder receptacle (92) or releases a tool holder that is to be removed from the tool holder receptacle (92).

60. The method according to embodiment 59, wherein the machine control system (80) actuates a tool drive (230, 250) for a tool spindle (216, 266) rotatably mounted on the tool holder (90), in particular using a program or program code, such that said tool spindle stands and, in particular, remains standing in a defined rotary position before the insertion or after the removal of the tool holder (90) into or from the tool holder receptacle (92).

61. The method for operating a machine tool according to one of the preceding embodiments or according to one of embodiments 47 to 60, wherein the machine control system (80) controls the handling apparatus (60), in particular using a program or program code, such that, when changing a tool holder (90), it moves the tool holder gripper (98) through the working area (50) along a stored tool changing path as far as the tool holder receptacle (92) standing, in particular, in a changing position.

62. The method according to embodiment 61, wherein the machine control system (80) captures and stores, in particular using a program or program code, a manually controlled or manually specified movement of the tool holder gripper (98) and moves the tool holder gripper (98) in accordance with this tool changing path to this tool holder receptacle (92).

63. The method for operating a machine tool according to one of the preceding embodiments or according to one of embodiments 47 to 62, wherein the machine control system (80) controls a or the handling apparatus (60), in particular using a program or program code, such that said handling apparatus (60) removes workpieces (W) from at least one workpiece spindle (22) and passes them to a workpiece feed and/or removal apparatus (72).

64. The method according to one of embodiments 47 to 63, wherein, in particular using a program or program code, the machine control system (80) deactivates a workpiece clamping apparatus (44) of the workpiece receptacle (42) of the respective workpiece spindle (22) for removing a workpiece (W) or activates it, after the insertion of a workpiece (W), to clamp the workpiece (W).

65. The method according to one of the preceding embodiments 47 to 64, wherein the machine control system (80) controls the handling apparatus (60), in particular using a program or program code, such that the handling apparatus moves the workpiece gripper (68) along a defined specified workpiece changing path through the working area (50) to the workpiece spindle (22).

66. The method according to embodiment 65, wherein the machine control system (80) captures, in particular using a program or program code, a manually controlled or manually specified movement of the workpiece gripper (68) through the working area (50) and to the workpiece spindle (22) as the workpiece changing path, stores it and subsequently utilizes it as the stored changing path for the exchanging of a workpiece (W) from this workpiece spindle (22).

67. The method for operating a machine tool according to one of the preceding embodiments or according to one of embodiments 47 to 63, wherein the machine control system (80) controls the handling apparatus (60), in particular using a program or program code, such that, with its gripper receptacle (66), said handling apparatus carries out a change between a workpiece gripper (68) and a tool holder gripper (98) or between two workpiece grippers or between two tool holder grippers.

68. The method according to one of embodiments 63 to 67, wherein the machine control system (80) detects, in particular using a program or program code, whether a workpiece gripper (68) or a tool holder gripper (98) is received in the gripper receptacle (66).

69. The method according to embodiment 68, wherein the machine control system (80) controls the handling apparatus (60), in particular using a program or program code, such that, in order to change between the workpiece gripper (68) and the tool holder gripper (98) or between two workpiece grippers or between two tool holder grippers, said handling apparatus places one thereof in the gripper store (100) and removes the other thereof from the gripper store (100).

70. The method according to one of embodiments 47 to 69, wherein the machine control system (80) detects by means of the handling apparatus (60), in particular using a program or program code, a code on the workpiece gripper (68) and/or on the tool holder gripper (98).

71. The method according to one of embodiments 68 to 70, wherein on the basis of the position of the workpiece gripper (68) or the tool holder gripper (98) in the gripper store (100), the machine control system (80) identifies them, in particular using a program or program code.

The invention relates not only to a multi-spindle machine tool but also to a machine tool comprising a machine frame, a workpiece spindle held on the machine frame with a workpiece receptacle for receiving a workpiece to be machined in a working area and at least one tool carrier arranged in the working area with a tool holder receptacle into which a tool holder is insertable, a multi-axis handling apparatus arranged on the machine frame with which workpieces are insertable into the workpiece spindle and/or are removable therefrom, and also a machine control system for controlling the machine tool and the handling apparatus during a workpiece change.

With a machine tool of this type, it is required to carry out the entire machining process automatically as far as possible.

It is therefore an object of the invention to improve a machine tool of this generic type such that it can operate automatically as far as possible.

This object is achieved according to the invention with a machine tool of the type described above in that with the handling apparatus, also controlled by the machine control system, at least one tool holder is insertable into at least one tool holder receptacle and/or is removable therefrom.

This machine tool also has, in particular, one or more of the above-mentioned machine tool features.

The description above of solutions according to the invention thus further comprises, in particular, a machine tool with the different feature combinations defined by the following sequentially numbered embodiments:

1. A machine tool comprising a machine frame (10), a workpiece spindle (22) which is held on the machine frame (10) and has a workpiece receptacle (42) for receiving a workpiece (W) that is to be machined in a working area (50), at least one tool carrier (28) which is arranged in the working area (50) and has a tool holder receptacle (92) into which a tool holder (90) is insertable, a multi-axis handling apparatus (60) arranged on the machine frame (10) with which workpieces (W) are insertable into the workpiece spindle (22) and/or are removable therefrom, as well as a machine control system (80) for controlling the machine tool and the handling apparatus (60) during a workpiece change, wherein with the handling apparatus (60) also controlled by the machine control system (80), at least one tool holder (90) is insertable into the at least one tool holder receptacle (92) and/or is removable therefrom.

2. The machine tool according to embodiment 1, wherein the handling apparatus (60) has a gripper receptacle (66), by means of which the handling apparatus (60) can receive either a workpiece gripper (68) or a tool holder gripper (98).

3. The machine tool according to embodiment 2, wherein the workpiece gripper (68) and the tool holder gripper (98) can be placed in a workpiece gripper receptacle (152) and/or a tool holder gripper receptacle (154) of a gripper store (100).

4. The machine tool according to embodiment 3, wherein the gripper store (100) is arranged outside the working area (50).

5. The machine tool according to embodiment 3 or 4, wherein the gripper store (100) is arranged outside a machine hood (74).

6. The machine tool according to one of embodiments 2 to 5, wherein the machine control system (80) detects whether the workpiece gripper (68) and the tool holder gripper (98) is received in the gripper receptacle (66) of the handling apparatus (60).

7. The machine tool according to embodiment 6, wherein the machine control system (80) detects a code on the workpiece gripper (68) and on the tool holder gripper (98).

8. The machine tool according to one of embodiments 3 to 7, wherein the machine control system (80) detects the workpiece gripper (68) and the tool holder gripper (98) on the basis of their position in the gripper store (100).

9. The machine tool according to one of the preceding embodiments, wherein with the handling apparatus (60), controlled by the machine control system (80), the tool holders (90) are insertable into a tool holder magazine (96) or are removable therefrom.

10. The machine tool according to embodiment 9, wherein the tool holder magazine (96) has a magazine element (95) for receiving the tool holders (90), said magazine element being movable by way of a drive (97), and the drive (97) can be controlled by the machine control system.

11. The machine tool according to embodiment 9 or 10, wherein the tool holder magazine (96) is arranged outside the working area (50).

12. The machine tool according to one of embodiments 9 to 11, wherein the tool holder magazine (96) is arranged outside a machine hood (74).

13. The machine tool according to one of the preceding embodiments, wherein the tool carrier (28) has a tool carriage system (30) which carries the tool holder receptacle (92).

14. The machine tool according to embodiment 13, wherein the tool carriage system (30) is movable at least in an X-machining direction relative to the workpiece spindle (22).

15. The machine tool according to one of the preceding embodiments, wherein the tool holder (90) is insertable into the tool holder receptacle (92) in an inserting direction (178) extending approximately parallel to a workpiece spindle axis (24) of the respective workpiece spindle (22).

16. The machine tool according to one of embodiments 1 to 15, wherein the tool holder (90) is insertable into the tool holder receptacle (92) in an inserting direction (288) extending transversely to a workpiece spindle axis (24) of the respective workpiece spindle (22).

17. The machine tool according to one of the preceding embodiments, wherein a fixing device (180) for fixing the tool holder (90) in the tool holder receptacle (92) is controllable with the machine control system (80).

18. The machine tool according to one of the preceding embodiments, wherein to form the fixing device (180), the tool holder receptacle (92) and the tool holder (90) have cooperating positively-locking elements (176,

182, 184, 292, 300), which are configured to be brought into engagement in a positively-locking manner on insertion of the tool holder (92) into the tool holder receptacle (92).

19. The machine tool according to embodiment 18, wherein the tool carrier (28) has a tool carriage (156) with a fixing receptacle (174) extending thereinto, into which a fixing body (176) of the tool holder (160) is insertable by moving it in an inserting direction (178) and is fastenable in an inserted state by fixing it in the fixing receptacle (174) by means of a positively-locking element (182).

20. The machine tool according to embodiment 19, wherein the positively-locking element is a fixing wedge body (182) which is movable in the tool carriage (156) in a movement direction extending transversely to the inserting direction (178) between a releasing position and a fixing position and in the fixing position, the fixing wedge body (182) cooperates with a wedge receptacle (184) of the fixing body (176).

21. The machine tool according to embodiment 20, wherein the fixing wedge body (182) is guided in a linearly movable manner in the tool carriage (156) and acts with a wedge face (186) on a wedge face (188) of the wedge receptacle (184) of the fixing body (176).

22. The machine tool according to embodiment 21, wherein the fixing wedge body (182) is movable between the fixing position and the releasing position by way of a drive (200) controlled by the machine control system (80).

23. The machine tool according to one of embodiments 1 to 18, wherein the tool carrier (28) has a tool carriage (156) with a tool holder receptacle unit (250) into which the tool holder (260, 370) is insertable in an inserting direction (288) which lies in a plane extending transversely to the workpiece spindle axis (24).

24. The machine tool according to embodiment 23, wherein the tool holder (260, 370) has a hollow-shaft cone (274) which is insertable into the tool holder receptacle unit (250) having a conical receptacle (274).

25. The machine tool according to embodiment 24, wherein the hollow-shaft cone (274) has a clamping contour (292) with which a clamping unit (300) of the tool holder receptacle (250) cooperates.

26. The machine tool according to embodiment 25, wherein the clamping unit (300) can be acted upon by a clamping actuating unit (320) in the direction of its clamping position in which it clampingly fixes the hollow-shaft cone (274).

27. The machine tool according to one of embodiments 23 to 26, wherein in the clamping position, the clamping unit (300) draws the hollow-shaft cone (274) in the direction of the conical axis (286) into the conical receptacle (282) and presses it radially to the conical axis (286) against the conical receptacle (282).

28. The machine tool according to one of the preceding embodiments, wherein arranged stationary on the tool carriage system (30) is a tool drive (220, 350), with which a tool spindle (218, 266) which is rotatably mounted in the tool holder (90) is drivable.

29. The machine tool according to embodiment 28, wherein the tool drive (230, 350) is configured to be coupled by means of a coupling (224, 340) to the tool spindle (218, 266).

30. The machine tool according to embodiment 29, wherein the coupling (224, 340) has coupling elements configured to be brought into engagement when the tool holder (90) is inserted into the tool holder receptacle (92).

31. The machine tool according to embodiment 30, wherein one of the coupling elements (226, 338) has a receptacle extending transversely to the rotation axis and the other of the coupling elements (228, 336) has an engagement for the receptacle extending transversely to the rotation axis.

32. The machine tool according to one of embodiments 28 to 31, wherein the tool holder (90) is provided with a rotary fixing (234, 362) for rotationally fixed securing of the rotatable tool spindle (216, 266).

33. The machine tool according to embodiment 32, wherein with the tool holder (90) fixed in the tool holder receptacle (92), the rotary fixing (234, 362) is automatically in an inactive position and, on release of the fixed tool holder, automatically transfers into an active rotation-fixing position.

34. The machine tool according to one of the preceding embodiments, wherein the machine tool is a multi-spindle machine tool in which the plurality of tool spindles (22) are arranged about a spindle drum axis (20).

35. The machine tool according to embodiment 34, wherein the spindle axes (24) of the workpiece spindles (22) are oriented parallel to the spindle drum axis (20).

Moreover, the invention relates not only to a method for operating a multi-spindle machine tool, but also to a method for operating a machine tool according to one or more of the features described above, wherein the machine control system controls the handling apparatus, in particular using a program or program code, such that, in the first place, the handling apparatus removes workpieces at least from a workpiece spindle and passes them to a workpiece feed and/or removal apparatus and, in the second place, the handling apparatus removes at least one tool holder from a tool holder magazine and inserts it into at least one tool holder receptacle of the at least one tool carrier.

The advantage of the solution according to the invention is therefore to be seen in that with a single handling apparatus, at least an insertion of a tool holder into a tool carrier can be carried out.

It is also preferably provided that the machine control system controls the handling apparatus, in particular using a program or program code, such that with the handling apparatus, workpieces from the workpiece feed and/or removal apparatus are also inserted into a workpiece spindle.

Furthermore, it is preferably provided according to an advantageous development of the method according to the invention that the machine control system controls the handling apparatus, in particular using a program or program code, such that said handling apparatus removes a tool holder from a tool holder receptacle and places it, for example, in a tool holder magazine.

This method also has, in particular, one or more of the above-described method features.

36. A method for operating a machine tool according to one of the embodiments 1 to 35, wherein the machine control system (80) controls the handling apparatus (60), in particular using a program or program code, such that, in the first place, the handling apparatus (60) removes workpieces (W) at least from one workpiece spindle (22) and passes them to a workpiece feed and/or removal apparatus (72) and, in the second place, the handling apparatus (60) removes at least one tool holder (90) from a tool holder magazine (96) and inserts it into at least one tool holder receptacle (92) of the at least one tool carrier (28).

37. The method according to embodiment 36, wherein the machine control system (80) controls the handling apparatus (60), in particular using a program or program code, such that said handling apparatus carries out, with its gripper receptacle (66), a change between a workpiece gripper (68) and a tool holder gripper (98).

38. The method according to embodiment 36 or 37, wherein the machine control system (80) detects, in particular using a program or program code, whether a workpiece gripper (68) or a tool holder gripper (98) is received in the gripper receptacle (66).

39. The method according to embodiment 38, wherein the machine control system (80) controls the handling apparatus (60), in particular using a program or program code, such that, in order to change between the workpiece gripper (68) and the tool holder gripper (98), said handling apparatus places one thereof in a gripper store (100) and removes the other thereof from the gripper store (100).

40. The method according to one of embodiments 36 to 39, wherein the machine control system (80) detects by means of the handling apparatus (60), in particular using a program or program code, a code on the workpiece gripper (68) and/or on the tool holder gripper (98).

41. The method according to one of embodiments 36 to 40, wherein on the basis of the position of the workpiece gripper (68) and the tool holder gripper (98) in the gripper store (100), the machine control system (80) identifies them, in particular using a program or program code.

42. The method according to one of embodiments 36 to 41, wherein the machine control system (80) controls the handling apparatus (60), in particular using a program or program code, such that said handling apparatus inserts at least one tool holder (90) into a tool holder magazine (96) or removes it therefrom.

43. The method according to embodiment 42, wherein the machine control system (80) moves a magazine element (95) of the tool holder magazine (96) by means of a drive (97), in particular using a program or program code, such that by means of the handling apparatus (60), an access to a defined tool holder (90) in the magazine element (95) is possible.

44. The method according to one of embodiments 36 to 43, wherein the machine control system (80) moves a tool carriage system (30) of the tool carrier (28), in particular using a program or program code, such that its tool holder receptacle (92) stands in a changing position for exchanging the tool holder (90).

45. The method according to embodiment 44, wherein the machine control system (80) controls the handling apparatus (60), in particular using a program or program code, such that said handling apparatus inserts a tool holder (90) into the tool holder receptacle (92) standing in the changing position or removes it therefrom.

46. The method according to one of embodiments 36 to 45, wherein the machine control system (80) controls the handling apparatus (60), in particular using a program or program code, such that said handling apparatus inserts the tool holder (90) into the tool holder receptacle (92) in an inserting direction (178) extending approximately parallel to a workpiece spindle axis (24)

of the respective workpiece spindle (22) or removes it from said tool holder receptacle opposingly to this inserting direction.

47. The method according to one of embodiments 36 to 45, wherein the machine control system (80) controls the handling apparatus (60), in particular using a program or program code, such that said handling apparatus inserts the tool holder (90) into the tool holder receptacle (92) in a direction (288) extending transversely to a workpiece spindle axis (24) of the respective workpiece spindle (22) or removes it from said tool holder receptacle opposingly to this inserting direction.

48. The method according to one of embodiments 36 to 47, wherein the machine control system (80) actuates a fixing device (180) of the tool holder receptacle (92), in particular using a program or program code, such that said fixing device fixes a tool holder (90) inserted into the tool holder receptacle (92) or releases a tool holder (90) that is to be removed from the tool holder receptacle (92).

49. The method according to one of embodiments 36 to 48, wherein the machine control system (80) actuates a tool drive (220, 350) for a tool spindle (218, 266) rotatably mounted in the tool holder (90), in particular using a program or program code, such that said tool drive stands in a defined rotary position before the insertion or after the removal of the tool holder (90) into or from the tool holder receptacle (92) in order, in particular, to permit an uncoupling or coupling of a tool spindle (218, 266) of the tool holder (90) also standing in a defined rotary position.

50. The method according to one of embodiments 36 to 49, wherein, in particular using a program or program code, the machine control system (80) deactivates a workpiece clamping apparatus (44) of the workpiece receptacle (42) of the respective workpiece spindle (22) for removing a workpiece (W) or activates it, after the insertion of a workpiece (W), to clamp the workpiece (W).

51. The method according to one of embodiments 36 to 50, wherein the machine control system (80) controls the handling apparatus (60), in particular using a program or program code, such that the handling apparatus moves the workpiece gripper (68) along a defined specified workpiece changing path through the working area (50) to the workpiece spindle (22).

52. The method according to embodiment 51, wherein the machine control system (80) captures, in particular using a program or program code, a manually controlled or manually specified movement of the workpiece gripper (68) through the working area (50) and to the workpiece spindle (22) as the workpiece changing path, stores it and subsequently utilizes it as the stored changing path for the exchange of a workpiece (W) from this workpiece spindle (22).

53. The method according to one of embodiments 36 to 52, wherein the machine control system (80) controls the handling apparatus (60), in particular using a program or program code, such that when changing a tool holder (90), it moves the tool holder gripper (98) through the working area (50) along a stored tool changing path as far as the tool holder receptacle (92) standing, in particular, in a changing position.

54. The method according to embodiment 53, wherein the machine control system (60) captures and stores, in particular using a program or program code, a manually controlled or manually specified movement of the tool holder gripper (98) and moves the tool holder gripper (98) in accordance with this tool holder changing path to this tool holder receptacle (92).

Further features and advantages of the solution according to the invention are the subject matter of the following description and of the illustration in the drawings of an exemplary embodiment.

DETAILED DESCRIPTION OF THE INVENTION

Figure 1:
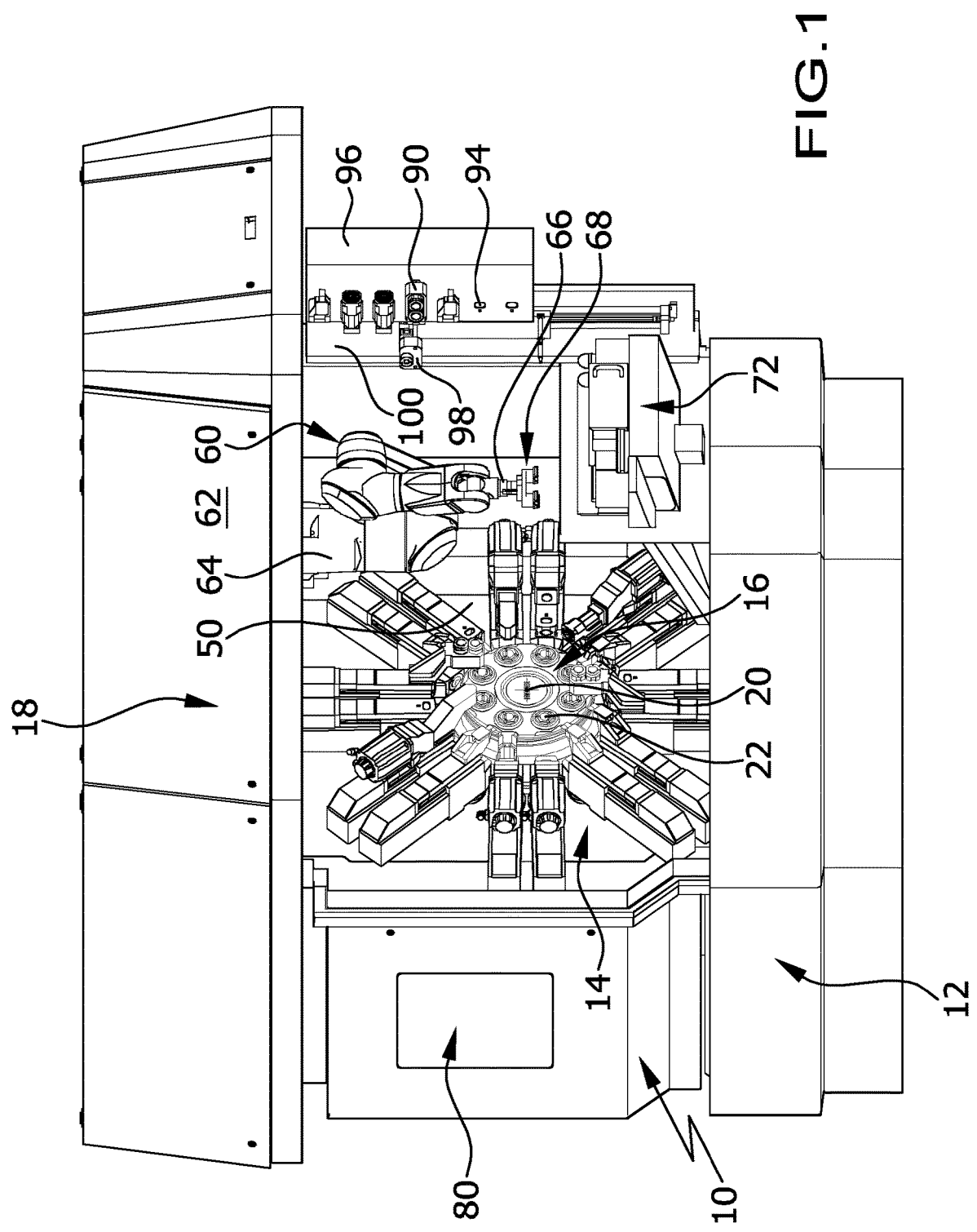
FIG. 1 is a perspective overall view of a multi-spindle machine tool as an example for a machine tool according to the invention.

An exemplary embodiment of a lathe according to the invention, for example, a multi-spindle lathe, illustrated in FIG. 1, comprises a machine frame identified overall as 10, which has a substructure 12 on which a stand 14 is arranged, wherein a spindle drum 16 is rotatably mounted in the stand 14.

The machine frame 10 further comprises a superstructure 18 arranged on the stand 14.

Figure 2:
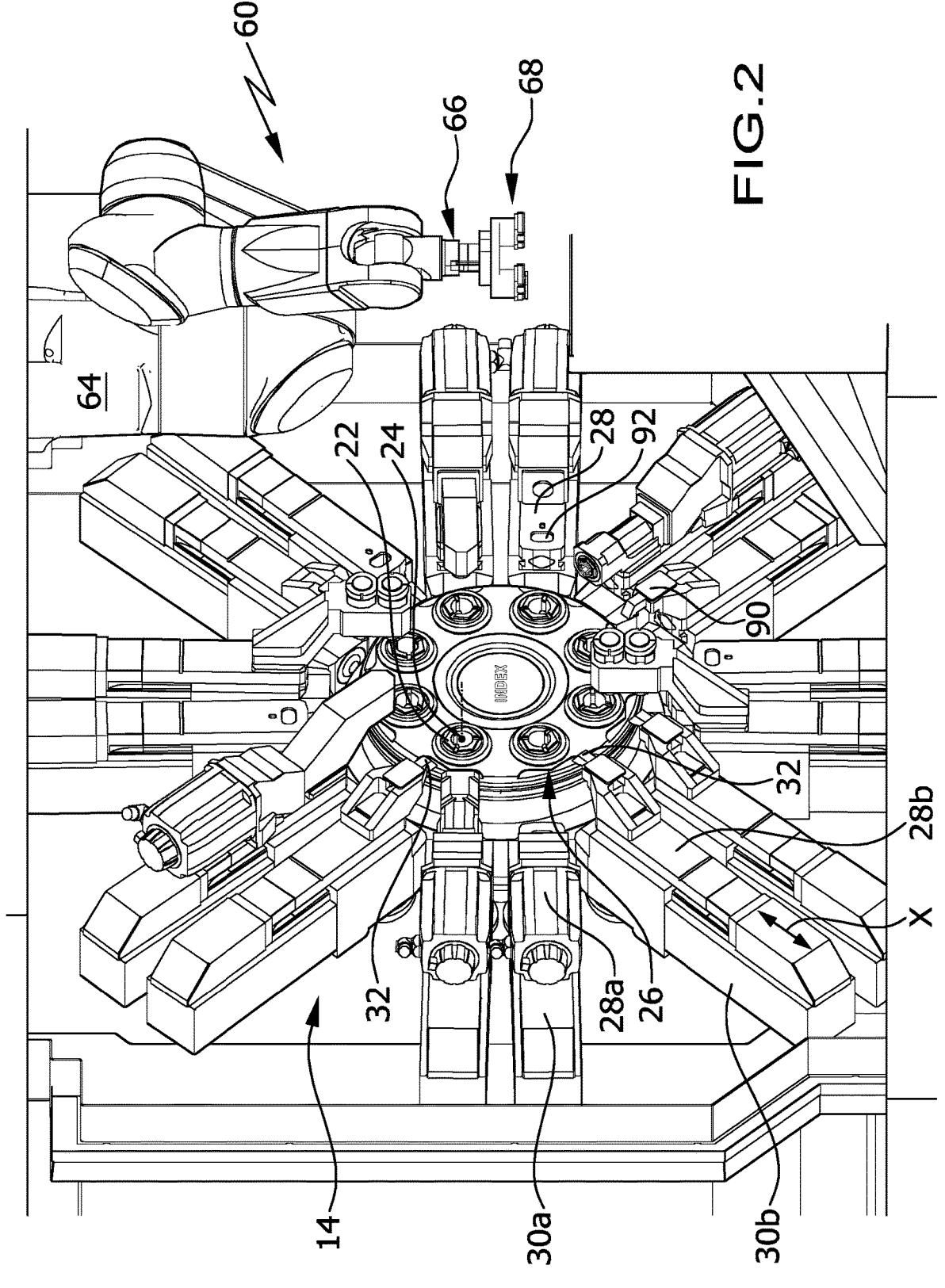
FIG. 2 is an enlarged perspective view of a spindle drum of the multi-spindle machine tool with the workpiece spindles and the tool carriers associated with the individual spindle stations and a handling apparatus with a workpiece gripper arranged therein.

As also shown in FIGS. 1 and 2, the spindle drum 16 is mounted on the stand 14 to be rotatable about a spindle drum axis 20 and has a large number of workpiece spindles 22 arranged, preferably at the same radial spacing, about the spindle drum axis 20 and, in particular, at equal angular spacings from one another, said workpiece spindles themselves also being mounted rotatable relative to the spindle drum 16 about spindle axes 24 oriented parallel to the spindle drum axis 20.

Preferably, the spindle drum 16 is rotatable about the spindle drum axis 20 relative to the stand 14 such that the individual workpiece spindles 22 are movable into spindle stations 26 that are arranged static relative to the stand 14, wherein the spindle stations 26 are arranged stationary relative to the stand 14 and thus, by advancing the spindle drum 16, for example, all the workpiece spindles 22 can be positioned, one after the other, in each of the spindle stations 26.

Furthermore, at least one tool carrier 28, for example possibly also two or more tool carriers 28a and 28b, as shown in FIG. 2 in the case of the spindle station 26, are associated with each of the spindle stations 26.

Each of the tool carriers 28 preferably has a tool carriage system 30, in the case of the spindle station 26, a tool carriage system 30a and 30b, wherein each carriage system 30 is movable radially to the spindle axis 24 of the respective workpiece spindle 22 positioned in the respective spindle station 26 and thus in this case is movable in an X-direction.

Furthermore, the carriage systems 30 are additionally configured such that they are also movable in a direction parallel to the spindle axis 24 of the workpiece spindle 22 positioned in the respective spindle station 26 and therefore in a Z-direction.

A multi-spindle machine tool of this type is described, for example, in EP 0 834 379 A, to the entire content of which reference is made with respect to the function of a multi-spindle lathe of this type.

Figure 3:
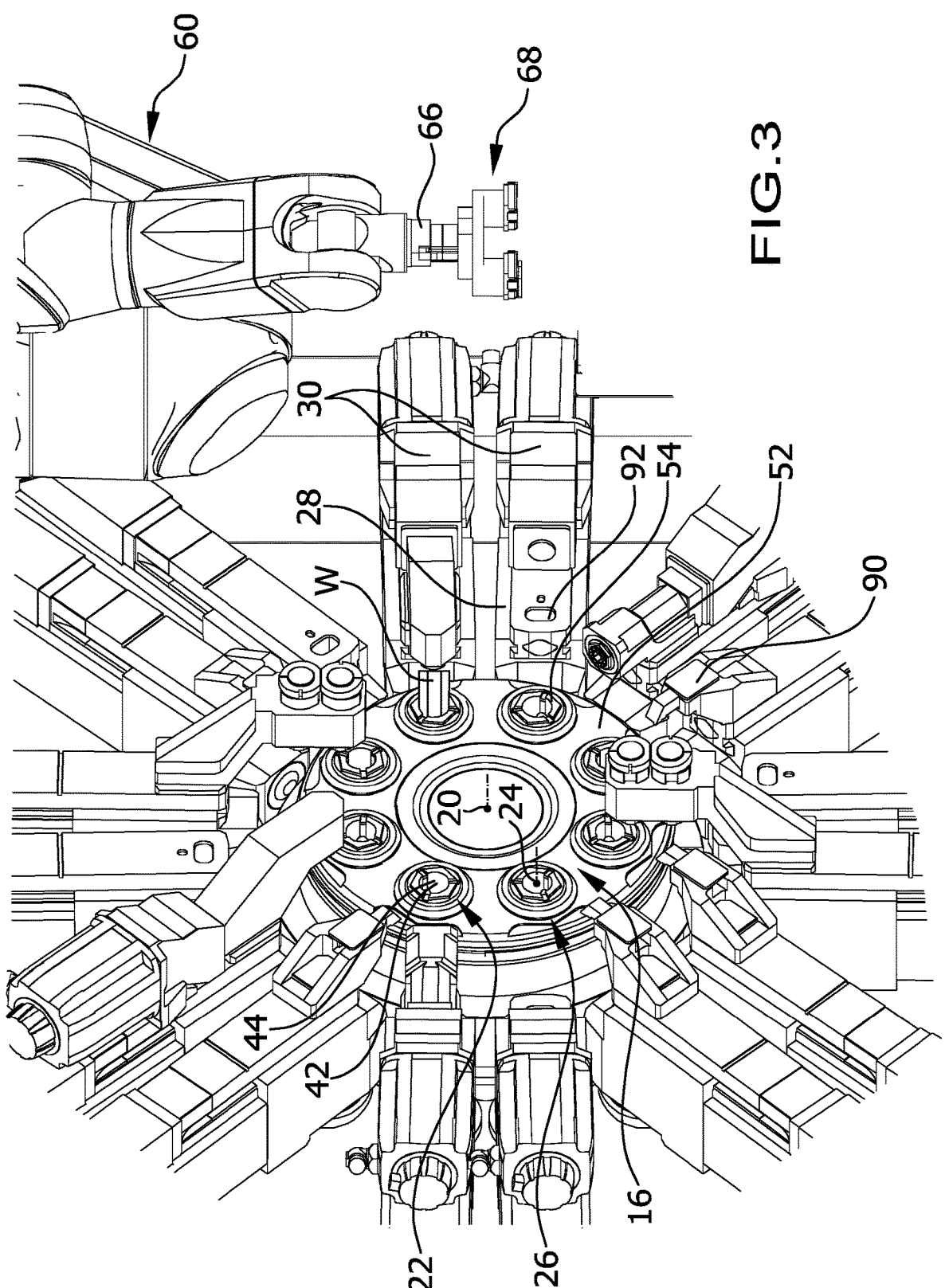
FIG. 3 is a further enlarged perspective view of a front side of the spindle drum with the workpiece spindles in the individual spindle stations and an enlarged view onto the tool carriers and their tool carriage systems.

Furthermore, as shown in FIG. 3, each of the workpiece spindles 22 is provided with a workpiece receptacle 42 into which a workpiece W, shown by way of example, is insertable, wherein the respective workpiece receptacle 42 additionally has a workpiece clamping apparatus 44 for clamping the workpiece W.

As shown in FIGS. 1 and 3, the spindle drum 16 adjoins with its end face 52 a working area 50 situated in front of it and the workpiece spindles 22 are also arranged in the spindle drum 16 such that their end faces 54 situated in the end face 52 of the spindle drum 16 also adjoin the working area 50 and thereby, for example, slightly protrude beyond the end face 52 of the spindle drum 16, wherein each of the workpiece receptacles 42 extends, starting from the respective end face 54 of the workpiece spindle 22, into this workpiece spindle 22 and also the workpiece clamping apparatus 44 is configured as part of the workpiece receptacle 42 and is arranged in the respective workpiece spindle 22.

For the handling of the workpieces W which are each to be inserted into the workpiece receptacles 42 and then to be fixed clamped by the respective workpiece clamping apparatus 44, as shown in FIG. 1, a handling apparatus identified overall as 60 is provided which, as shown in FIG. 1, is arranged suspended on the superstructure 18 in a region 62 on a side opposite the stand 14, said region extending beyond the working area 50, so that a foot 64 of the handling apparatus 60 is arranged firmly on the region 62, specifically at a spacing from the end face 54 so that the working area 50 in which a machining of the workpieces W received in the workpiece spindles 22 by means of tools 32 held by the tool carriers 28 can take place preferably lies between the foot 64 of the handling apparatus 60 and the end face 52 of the spindle drum 16, as described in detail below.

The handling apparatus 60 carries a gripper receptacle 66 and is configured, for example, as a multi-axis pivot-arm handling apparatus with which the gripper receptacle 66 is preferably pivotable about a total of at least five, or better at least six axes.

The handling apparatus 60 enables a workpiece gripper 68 inserted into the gripper receptacle 66 to move through the working area 50 and out of the working area 50 so that workpieces W can be removed from and/or inserted into the individual workpiece receptacles 42.

The workpieces W are each clamped in the respective workpiece clamping unit 44 in order then to be machined with the tools 32 by driving the respective workpiece spindle 22 in the individual spindle stations 26, wherein this takes place by advancing the spindle drum 16 about the spindle drum axis 20 so that after the machining in one of the spindle stations 26, a machining with the at least one tool carrier 28 associated with said spindle station takes place and, after advancing the spindle drum 16, in the subsequent spindle station 26, again a machining with the at least one tool carrier 28 associated with this spindle station can take place.

After the machining of the workpiece in a plurality of spindle stations 26, for example 4 spindle stations 26 or all eight spindle stations 26, a removal of the ready already machined workpiece by the handling apparatus 60 takes place using the workpiece gripper 68, wherein after the removal of this already machined workpiece W, an unmachined workpiece is inserted, where possible, into the same workpiece spindle 22, again by an advancing of a workpiece rod through the respective workpiece spindle 22 or with the handling apparatus 60 by means of the workpiece gripper 68.

Figure 4:
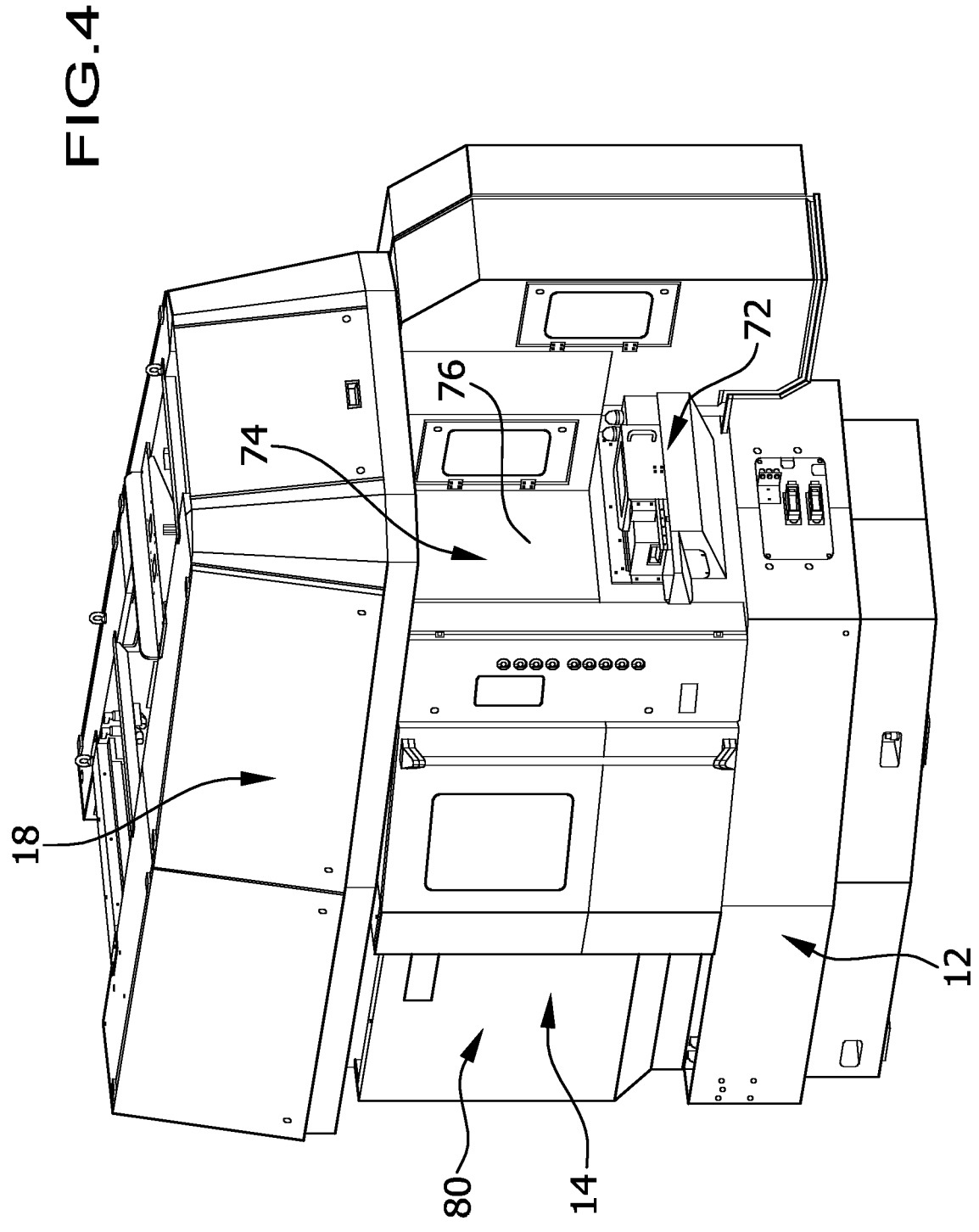
FIG. 4 is an overall view similar to FIG. 1 with an illustration of the machine tool with a machine hood.

The feeding of unmachined workpieces and the removal of already machined workpieces takes place, for example, by means of a workpiece feed and/or removal apparatus 72 which is preferably arranged outside the working area 50 and, in particular, even outside a machine hood 74, as shown in FIG. 4, wherein the machine hood 74 has an opening 76 which is closable with a door 78, through which opening handling apparatus 60 can access the workpiece feed and/or removal apparatus 72 from within the machine hood 74.

The control of the handling apparatus 60 together with the workpiece gripper 68 and also the actuation of the workpiece clamping apparatus 44 of the workpiece receptacle 42 takes place in the same manner as the machining of the workpieces W by means of the tools 32 by way of a machine control system, identified overall as 80, as set out in detail below.

However, the handling apparatus 60 according to the invention serves not only for inserting unmachined workpieces into the respective workpiece receptacle 42 and for removing already machined workpieces from the respective workpiece receptacle 42, but is also used for inserting tool holders 90 carrying tools 32 into the respective tool holder receptacles 92 of the tool carriers 28 or for removing them therefrom (FIGS. 1 to 3).

For this purpose, a tool holder magazine 96 (FIG. 1) is provided which is preferably also arranged outside the working area 50 and, in particular, also outside the machine hood 74, in order to be able to make available a large number of tool holders 90 with corresponding tools.

A tool holder magazine 96 of this type can be configured in wide variety of ways.

In the simplest case, it also has stationary tool holder receptacles 94 or it can also have movable tool holder receptacles 94 arranged on a magazine element 95, for example, a carriage or a circulating chain and thus being movable by a drive 97 controlled by the machine control system 80 for moving the magazine element 95 (FIG. 1).

For exchanging the tool holder 90, a tool holder gripper 98 is preferably provided which is also receivable in the gripper receptacle 66 of the handling apparatus 60, so that, in the first place, the handling apparatus 60 is capable of gripping workpieces W with the workpiece gripper 68 and, in the second place, of gripping tool holders 90 with the tool holder gripper 98, of removing them from the respective tool holder receptacle 94 in the tool holder magazine 96 and of inserting them into the tool holder receptacle 92 of the desired tool carrier 28 or of removing them from the tool holder receptacle 92 of a tool carrier 28 of the tool holder magazine 96, so that with the same handling apparatus 60 with which a change of the workpieces is possible, a change of the tool holder 90 can also take place.

In order to be able to exchange the workpiece gripper 68 for a tool holder gripper 98 or vice versa, a gripper store identified overall as 100 is provided which can receive both the workpiece gripper 68 and also the tool holder gripper 98 in order to exchange the workpiece gripper 68 for the tool holder gripper 98 or to exchange the tool holder gripper 98 for the workpiece gripper 68.

Figure 5:
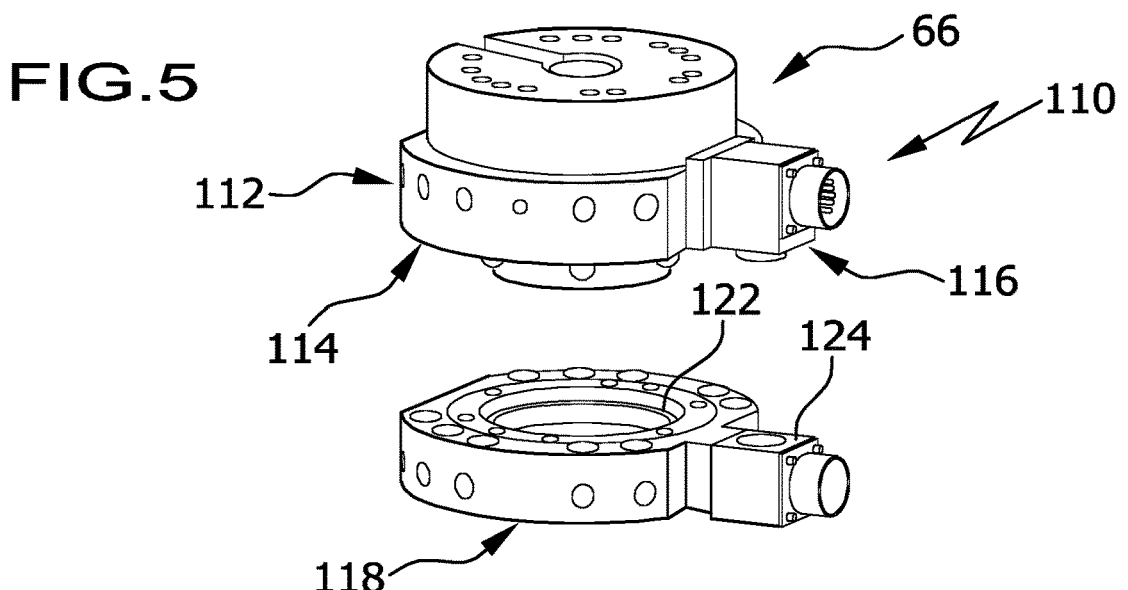
FIG. 5 is a perspective illustration of a gripper receptacle of the handling apparatus as part of a quick change system.

Preferably, for this purpose, the gripper receptacle 66 of the handling apparatus 60 is provided with a quick change system 110 as shown in FIG. 5, which has a quick change head 112 as the gripper receptacle 66, which comprises, firstly, a mechanical interface 114 and, secondly, a control interface 116 and cooperates with a quick change adapter 118 which is connected to the workpiece gripper 68 and also to the tool holder gripper 98, said quick change adapter also having a mechanical interface receptacle 122 which can be connected to the mechanical interface 114 and secondly a control interface receptacle 124 which is connectable to the control interface 116.

Figure 6:
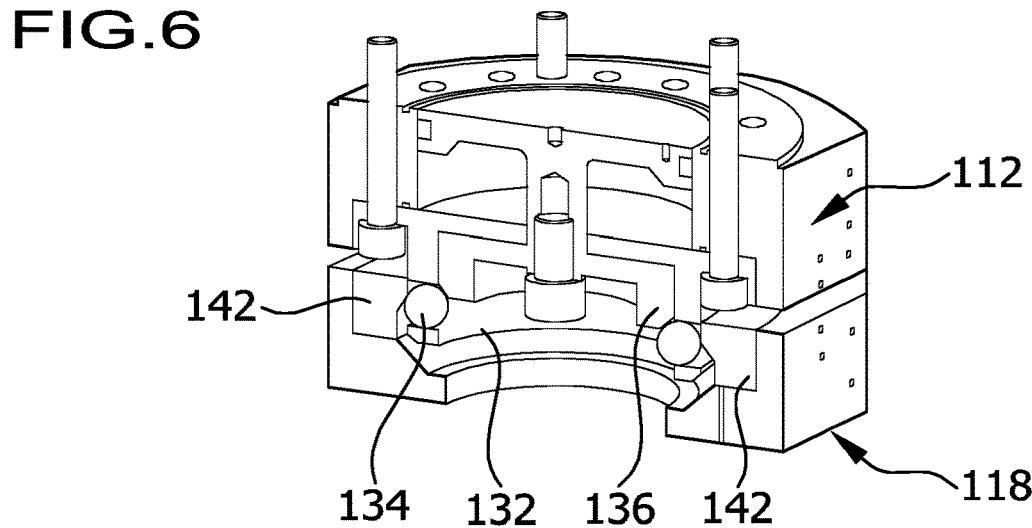
FIG. 6 is an enlarged illustration of the quick change system with a quick change adapter fixed on a quick change head.
Figure 7:
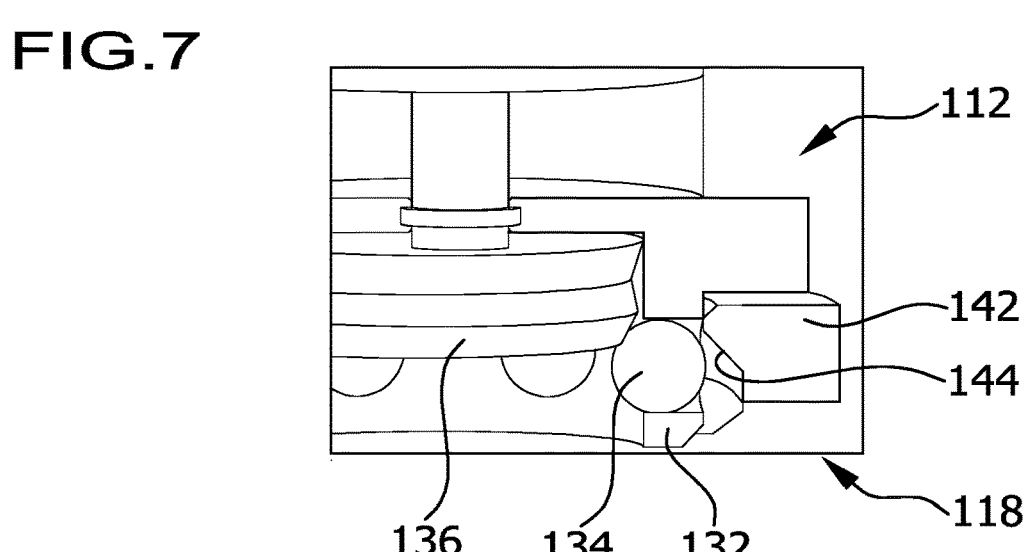
FIG. 7 is an enlarged illustration of the locking of the quick change adapter on the quick change head.

The mechanical interface 114 comprises, as shown for example in FIGS. 6 and 7, an annular body 132 in which locking bodies 134 are received in a radially movable manner and are movable radially outwardly by an actuating body 136. The mechanical interface receptacle 122 itself comprises an annular body 142 radially outwardly encompassing the annular body 132, which is provided with an undercut 144 in which the radially outwardly moved locking bodies 134 can engage in order to fix the mechanical interface receptacle 122 and thereby the workpiece gripper 68 or the tool holder gripper 98.

Furthermore, the control interface receptacle 124 for the control interface 116 comprises, for example, electrical contacts which cooperate with the control interface 116 when the mechanical interface receptacle 122 is connected to the mechanical interface 114.

The quick change system 110 is also controlled by the machine control system 80 which moves the quick change head 112, in particular, so that said quick change head engages in the quick change adapter 118 and thereby engages, for example, with the annular body 132 in the annular body 142 in order then to move the actuating body 136 so that it moves the locking body 134 radially outwardly in order to fix the annular body 142 by means of the undercut 144 and simultaneously to connect the contacts of the control interface 116 to the control interface receptacle 124.

By way of the creation of the connection between the control interface 116 and the control interface receptacle 124, in the first place, the gripper functions of both the workpiece gripper 68 and also the tool holder gripper 98 can be controlled in order to control the gripping functions such as gripping or releasing and, in the second place, the machine control system 80 recognizes by means of this connection between the control interface 116 and the control interface receptacle 122, for example, which of the grippers, that is, the workpiece gripper 68 or the tool holder gripper 98 are available for the handling apparatus 60.

However, alternatively to the recognition of the respective gripper 68 or 98, the possibility also exists of recognizing, merely by the position in which the respective gripper 68 or 98 is received in the gripper store 100, whether the workpiece gripper 68 or the tool holder gripper 98 is available to the handling apparatus 60 for gripping workpieces or tool holders 90.

However, this presupposes that for the workpiece gripper 68 and for the tool holder gripper 98, separate storage places are provided in the gripper store 100 in which they are placed for storage by the handling apparatus 60, so that an unambiguous identification thereof by the machine control system 60 is possible solely by way of the storage place of the respective gripper 68 or 98 in the gripper store 100.

Figure 8:
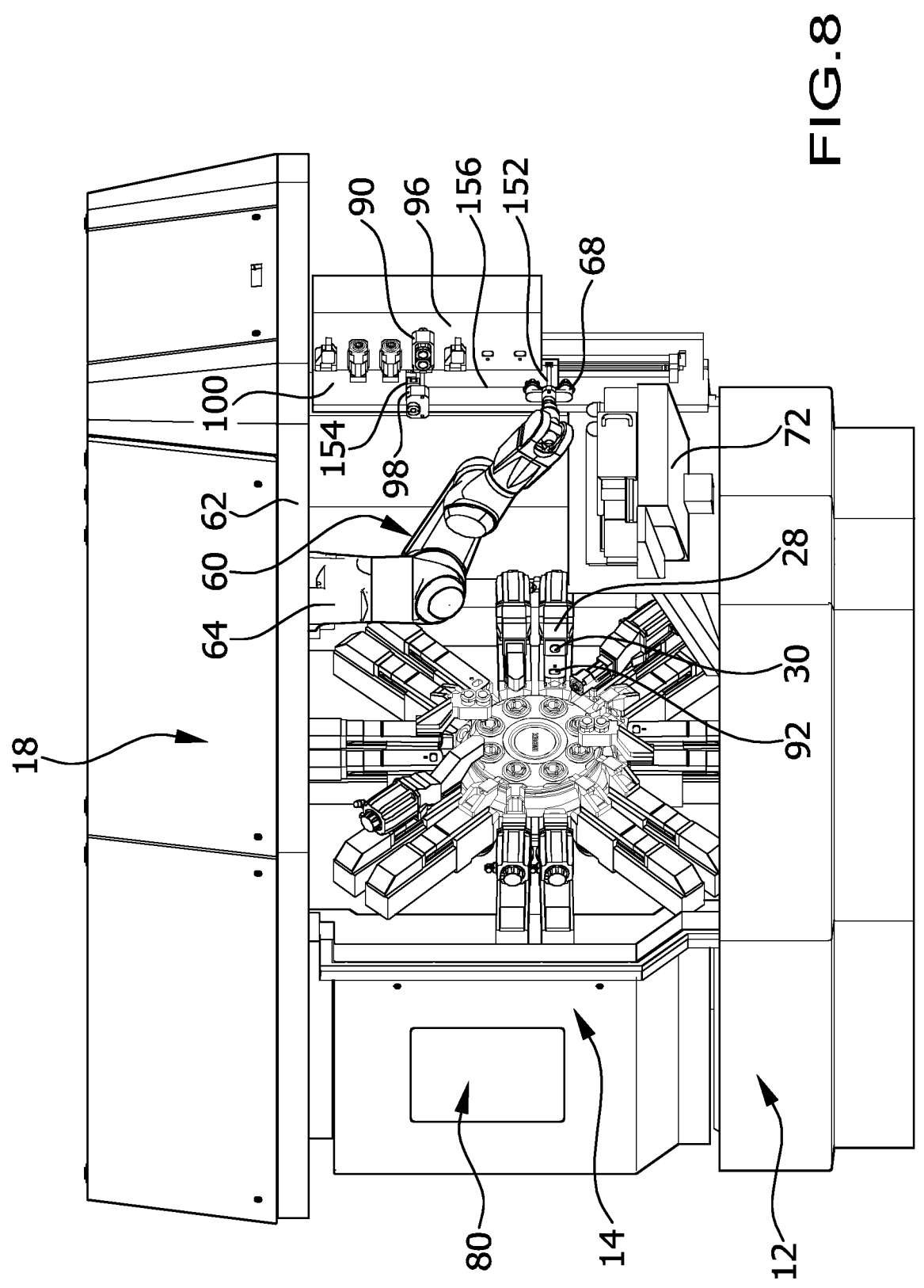
FIG. 8 is a perspective illustration of the machine tool according to FIG. 1 with the handling apparatus which places or grasps the workpiece gripper in a gripper store.

Therein, in one embodiment, the workpiece gripper receptacle 152 and the tool holder gripper receptacle 154 can be arranged statically in the gripper store 100 (FIG. 8).

It is, however, also conceivable to arrange the workpiece gripper receptacle 152 and the tool holder gripper receptacle 154 in the gripper store 100 on a carriage 156 that is movable such that the handling apparatus 60 is able, in only one access position, to access either the workpiece gripper 68 in the workpiece gripper receptacle 152 or the tool holder gripper 98 in the tool holder gripper receptacle 154, wherein in this case the machine control system 80 recognizes from the position of the carriage 156 of the gripper store 100 which of the grippers 68, 98 the handling apparatus receives or places.

If, for example, an exchange of one of the tool holders 98 from the tool holder magazine 96 into a tool holder receptacle 92 of one of the tool carriers 28, in particular its tool carriage system 30, is to take place, then, as shown in FIG. 8, the handling apparatus 60 places the workpiece gripper 68 into a workpiece gripper receptacle 152 of the gripper store

100 provided therefor and removes the tool holder gripper 98 from a tool holder gripper receptacle 154 of the gripper store 100.

Figure 9:
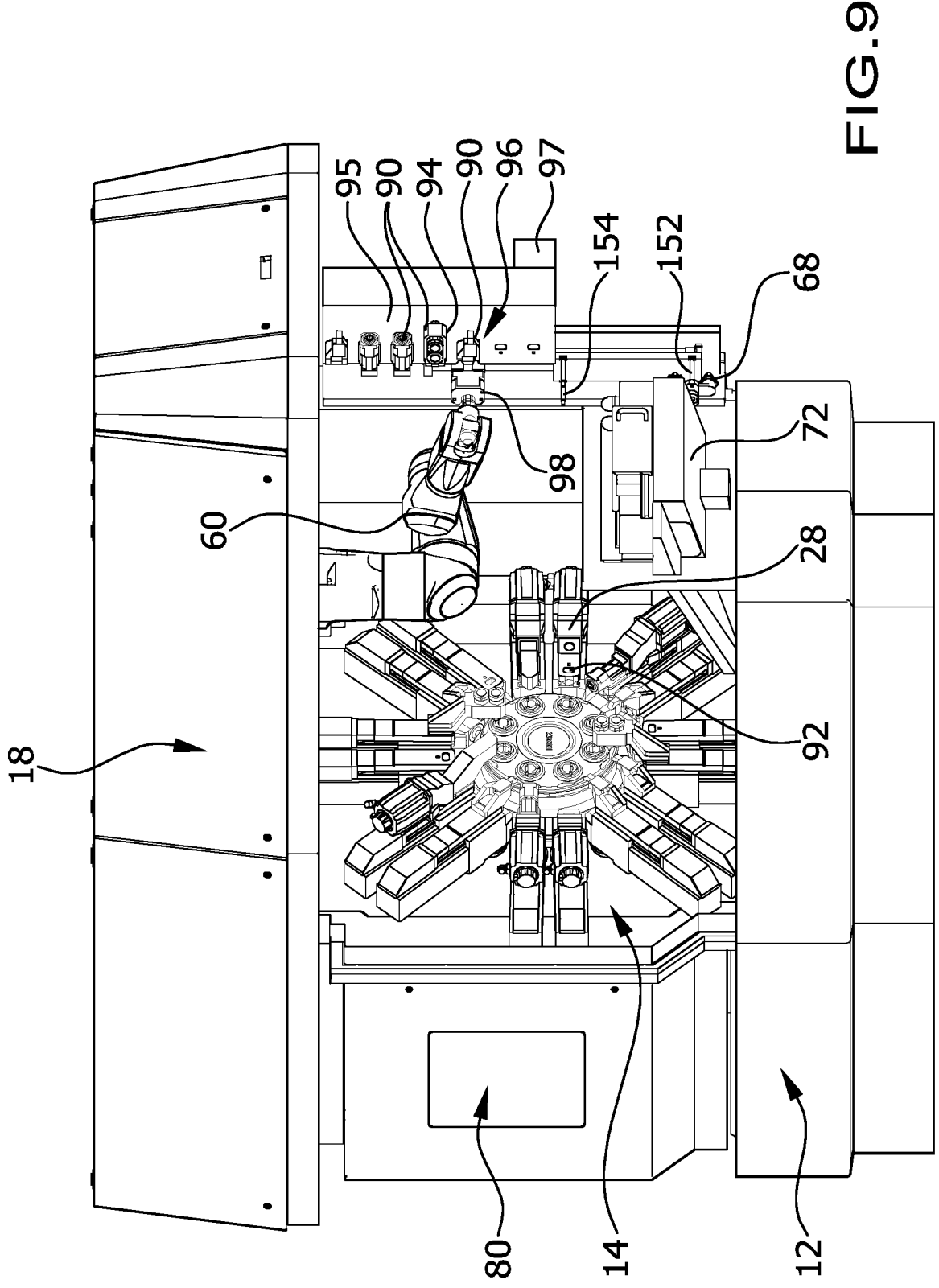
FIG. 9 is a perspective illustration according to FIG. 8 in which the handling apparatus grasps a tool holder in a tool holder magazine, with a tool holder gripper controlled by the machine control system.

If the tool holder gripper 98 is received in the gripper receptacle 66, as shown in FIG. 9, then the handling apparatus 60 has the possibility to grasp one of the tool holders 90 from the respective tool holder receptacle 94 of the tool holder magazine 96, to remove it from this tool holder receptacle 94 and to insert it into the tool holder receptacle 92 of the tool carrier 28, as FIG. 9 shows.

Figure 10:
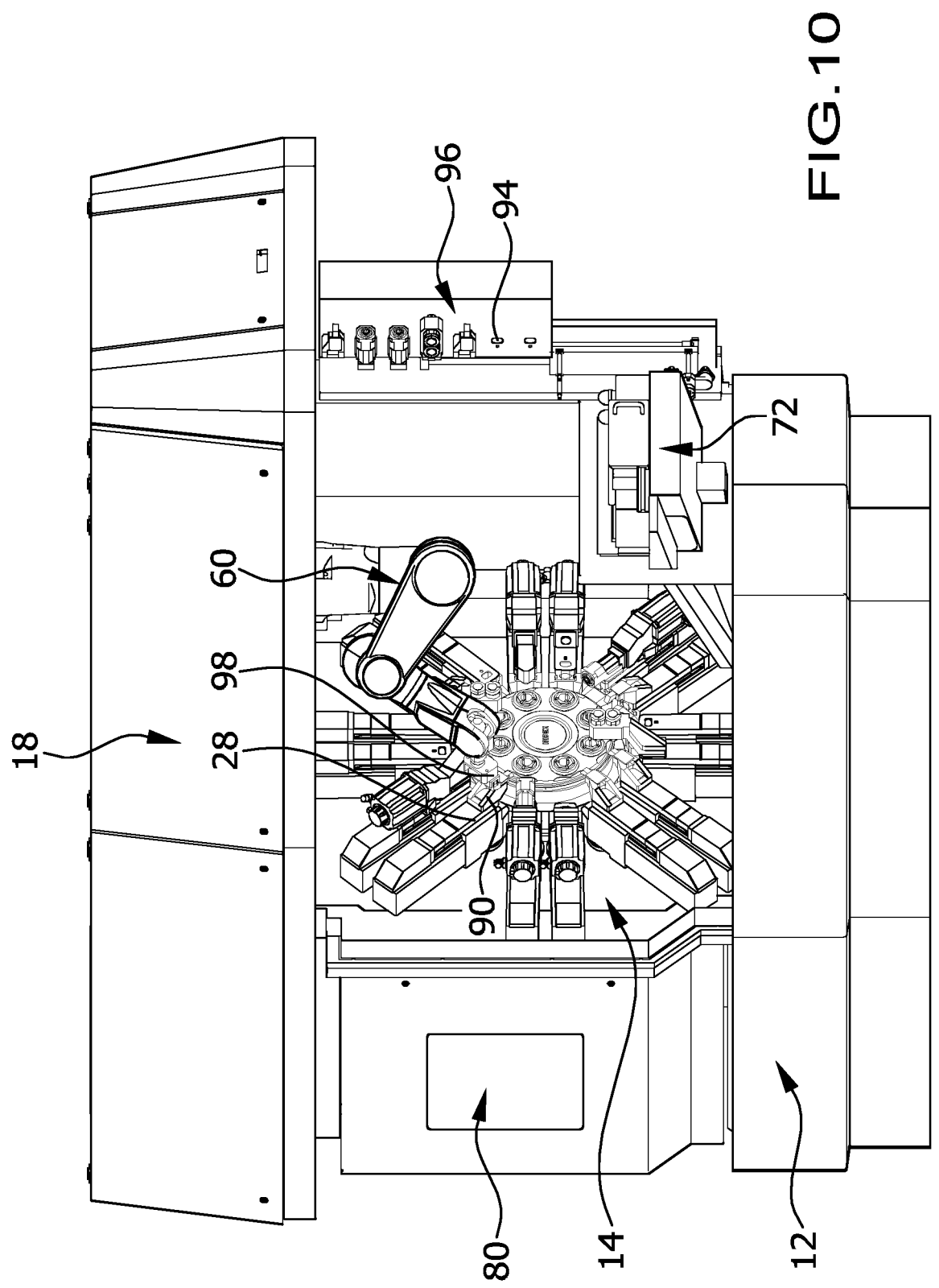
FIG. 10 is an illustration similar to FIG. 9 in which the handling apparatus grasps a tool holder held on a tool carrier, with the tool holder gripper controlled by the machine control system.

Thereafter, the possibility also exists, as shown in FIG. 10, of removing another tool holder 90 from another tool carrier 28 by means of the tool gripper 98 and to place it in a tool holder receptacle 94 of the tool holder magazine 96 provided for this, as shown, for example, in FIG. 10.

Figure 11:
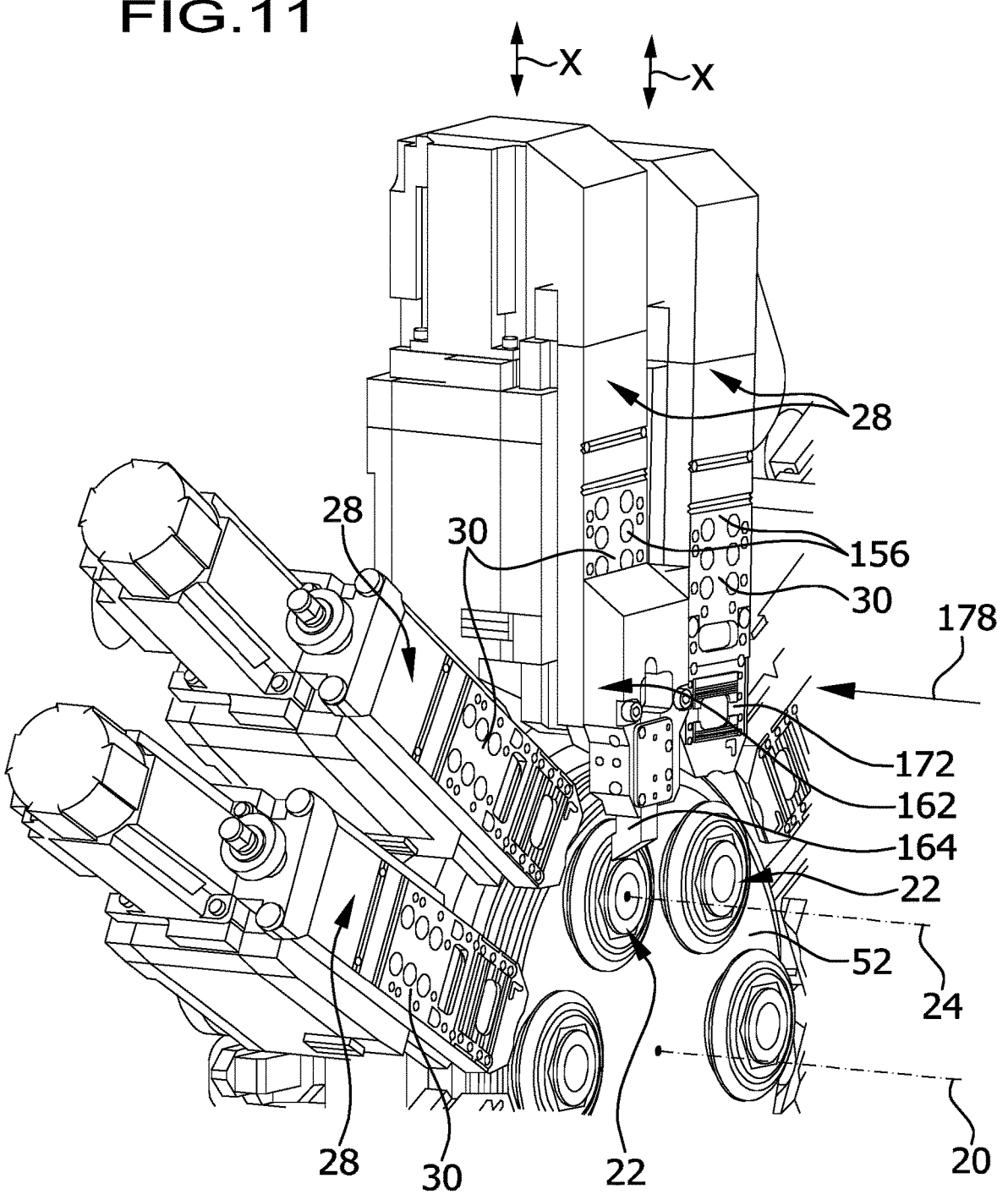
FIG. 11 is a partially enlarged perspective illustration of tool carriers with tool carriage systems and a tool holder positioned on a tool carriage of a tool carriage system.
Figure 12:
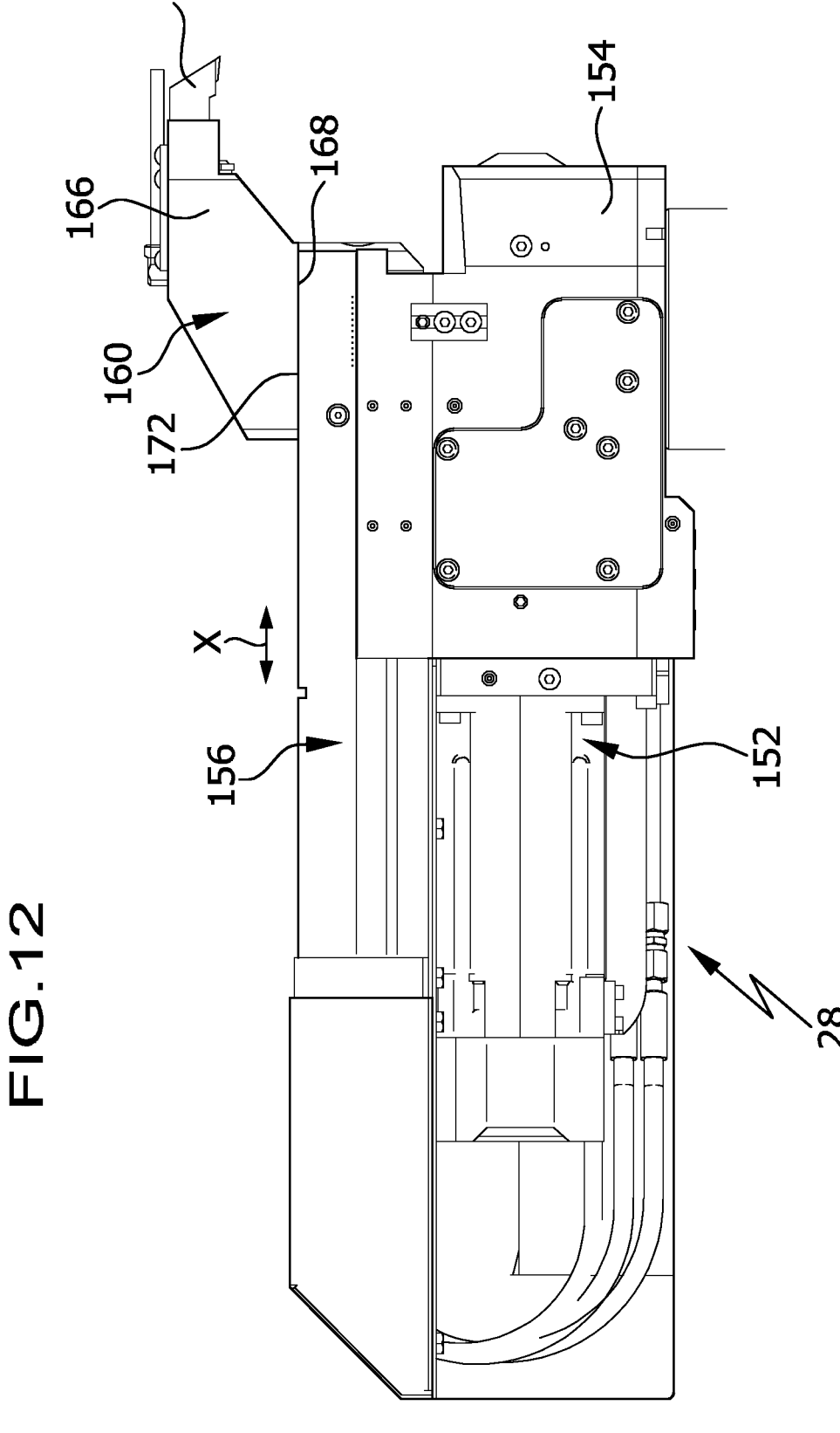
FIG. 12 is a side view of a tool carrier with the tool carriage illustrated in FIG. 11 and a tool holder seated on said tool carriage.

A first exemplary embodiment of a tool carrier 28 shown in FIGS. 11 and 12 comprises a tool carrier base 152 which is provided with a carriage drive 154 which has a drive motor (not shown) which is arranged, for example, in the tool carrier base 152 and drives a spindle drive (not shown) with which a tool carriage 156 guided on the tool carrier base is displaceable, for example, in the X-direction.

Arranged on the tool carriage 156, as an example for a tool holder 90, is a tool holder identified overall as 160, in which a static tool 164 is fixed.

The tool holder 160 comprises a tool holder body 166 which is supported with a supporting side 168 on a contact side 172 of the tool carriage 156.

Figure 13:
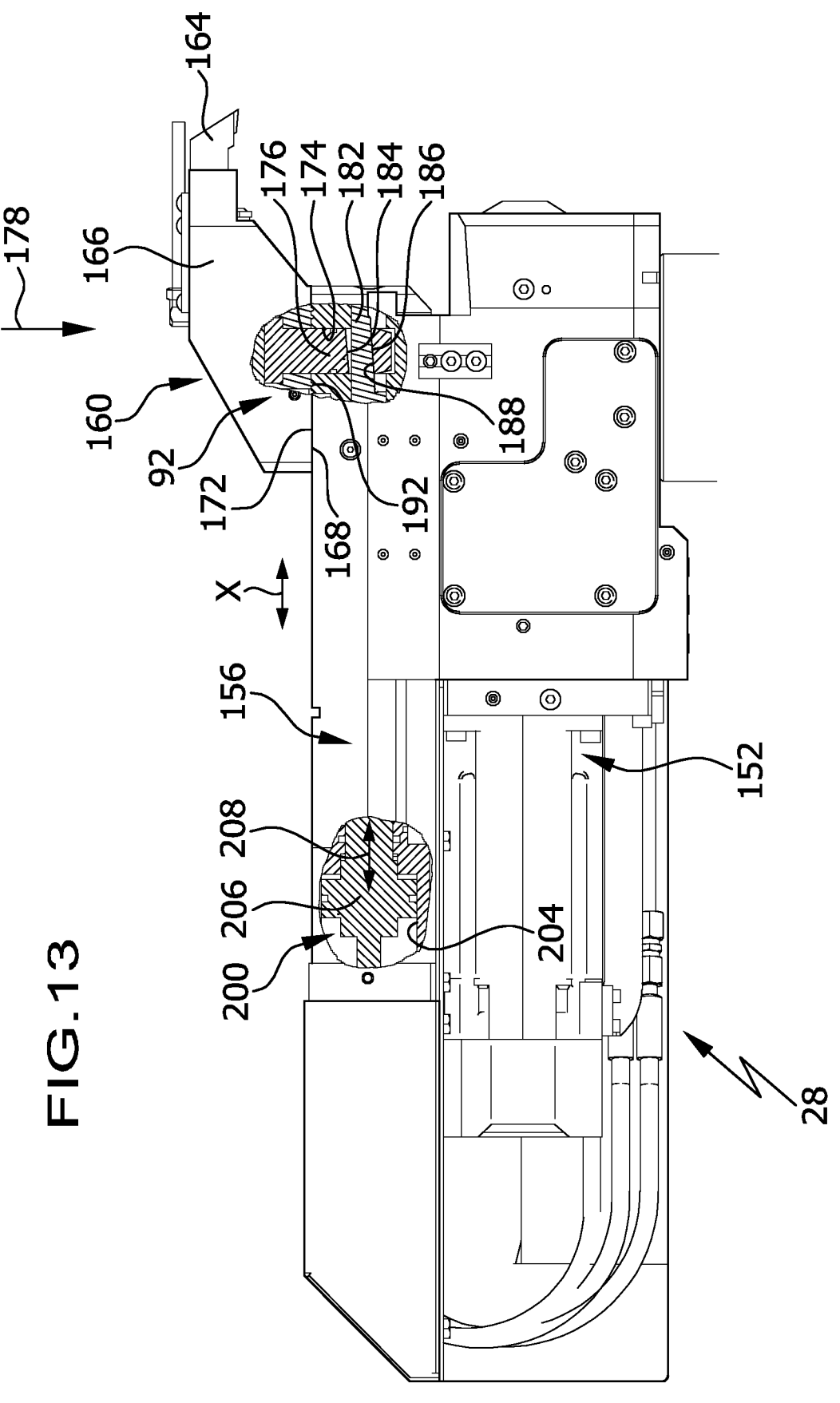
FIG. 13 is a side view according to FIG. 12 in a partially cut-away illustration in the region of a fixing device and a clamping actuating unit for the fixing device.

Furthermore, in the tool carriage 156, a fixing receptacle 174 extends thereinto, starting from the contact side 172, to receive a fixing body 176 which is insertable in an inserting direction 178 into the fixing receptacle 174, said fixing body being firmly connected to the tool holder body 166 and extending starting therefrom (FIG. 13).

The fixing body 176 is therein guided in the fixing receptacle 174 and can be impinged upon by a fixing wedge body 182 which extends through an opening 184 in the fixing body 176 and therein acts, with a wedge face 186 which faces away from the tool holder body 166, upon a wedge face 188 of the opening 184 in order thus to impinge upon the fixing body 176 such that a force is applied to said fixing body with the supporting side 168 in the direction of the contact side 172.

The fixing receptacle 174, the fixing body 176 with the opening 184 and the fixing wedge body 182 form a fixing device 180.

Preferably provided adjoining the fixing receptacle 174 in the supporting side 168 and the contact side 172 are mutually engaging toothings 192 which are held in engagement also with the application of force by the fixing body 176, against which the fixing wedge body 182 acts, in order to fix the tool holder body 166 rigidly on the tool carriage 156 both undisplaceably and also non-rotatably by pressing the supporting side 168 against the contact side 172.

The fixing receptacle 174 together with the contact side 172 therein forms the tool holder receptacle 92 for the tool holder 160.

For controlled movement of the fixing wedge body 182, a clamping actuating unit 200 is also provided in the tool carriage 156, configured, for example, as a hydraulic drive which has a cylinder chamber 204 in which a piston 206 is movable in a displacement direction 208 by the application of force by means of a hydraulic medium, in order either to bring the fixing wedge body 182 into engagement with the opening 184 or to withdraw it therefrom, wherein through the bringing into engagement with the opening 184, the fixing wedge body 182 impinges with the wedge face 186 upon the wedge face 188, in order to draw the fixing body 176, with the application of force, into the fixing receptacle 174.

Preferably, the clamping actuating unit 200 is therein also controlled by the machine control system 80 in order, in the first place, to fix the tool holder 160 in the tool holder receptacle 92 and, in the second place, by withdrawing the fixing wedge body 182 from the opening 184 of the fixing body 176 to release the tool holder 160 for removal.

The tool holder 160 of FIGS. 12 and 13 is a tool holder 160 for a static tool 164.

Figure 14:
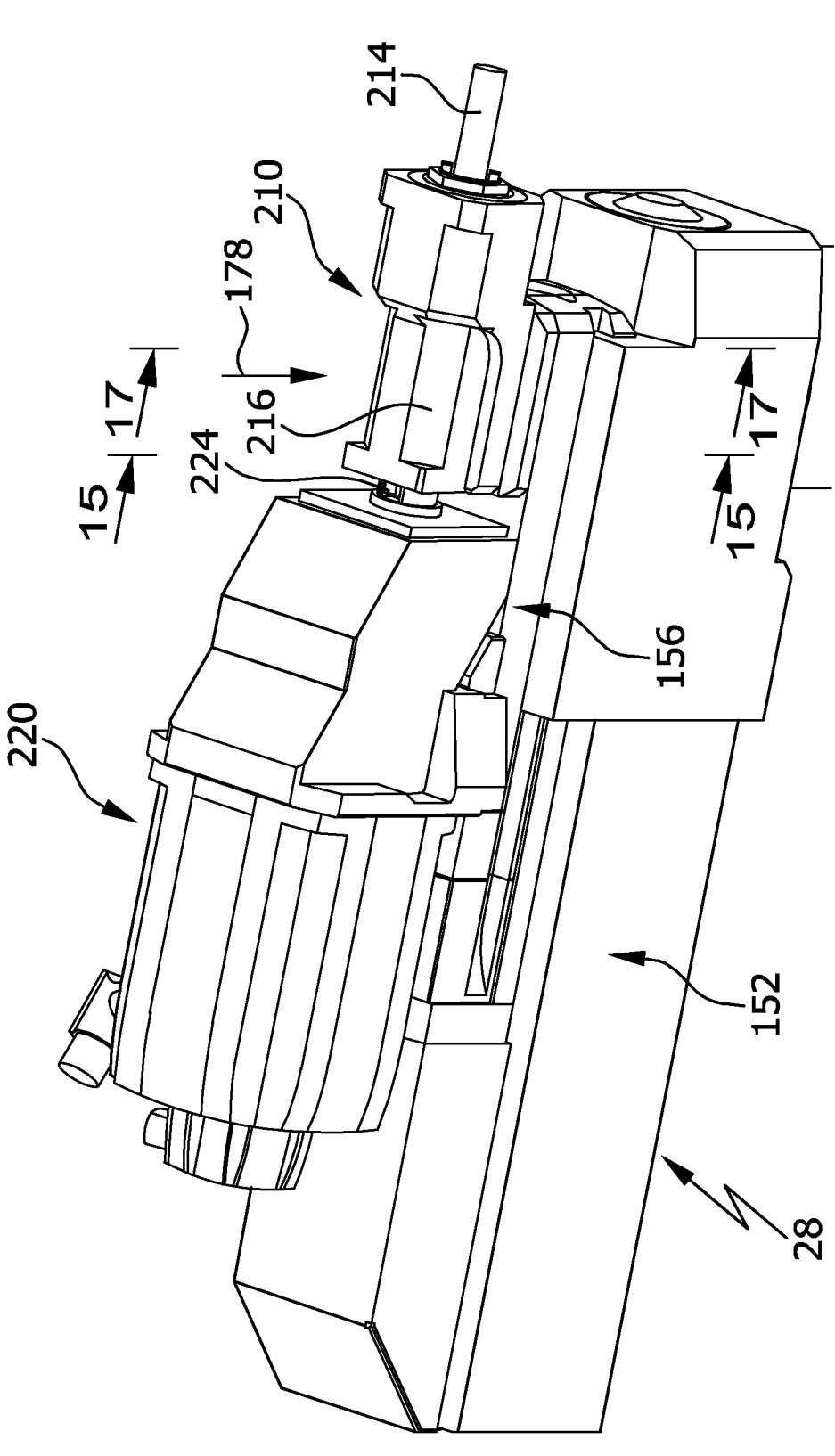
FIG. 14 is an illustration of the tool carrier similar to FIG. 12, but with a tool holder for a powered tool mounted on the tool carriage of the tool carrier and a tool drive mounted on the tool carriage.

A further example of a tool holder 90 is a tool holder 210, as shown in FIG. 14, which is configured as a powered tool holder, the tool 214 of which is drivable rotatingly, wherein for this purpose, it is rotatably mounted in the tool holder body 216 by means of a tool spindle 218 penetrating said tool holder body.

Therein, the tool holder body 216 is fixed in a similar manner as with the tool holder 160 on the tool carriage 156.

Figure 15:
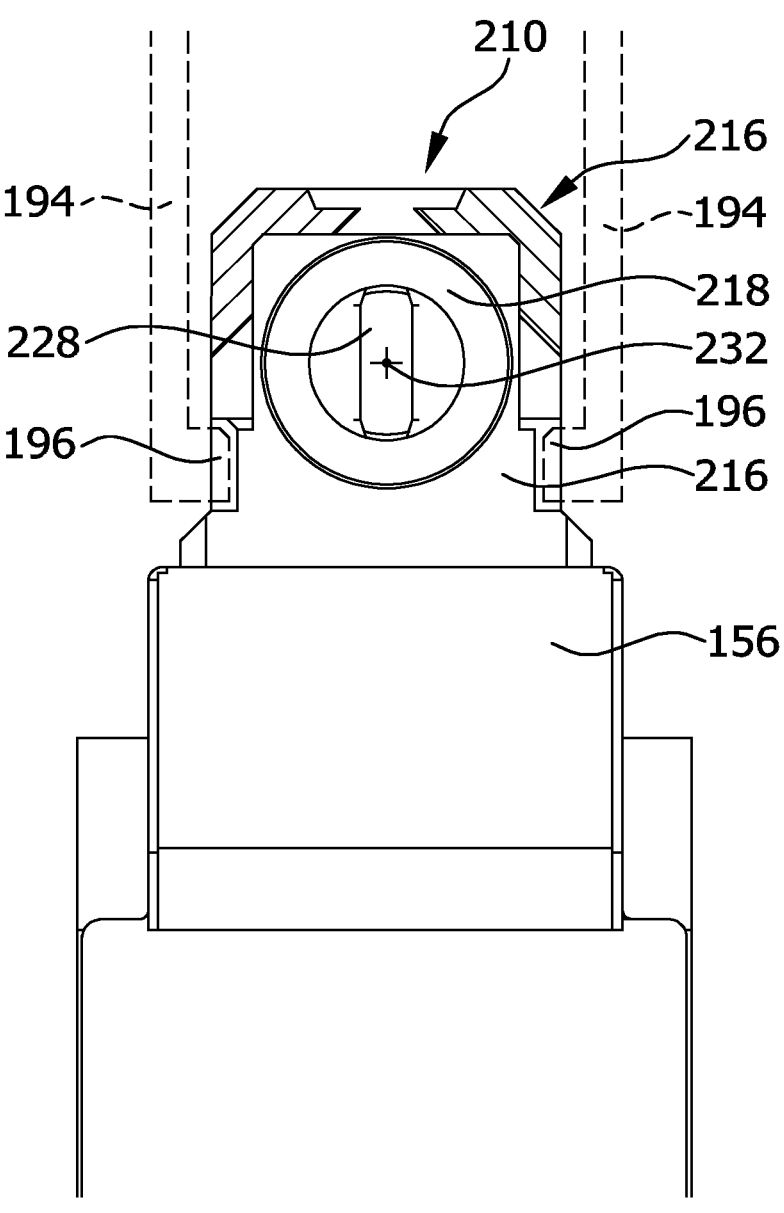
FIG. 15 is a section along the line 15-15 through the tool holder in FIG. 14.

For handling, with these tool holders 160 and 210, as shown in FIG. 15 for the tool holder 210, the tool holder gripper 98 engages with gripper fingers 194 in lateral grooves 196 of the tool holder body 216.

For driving the tool spindle 218, a tool drive identified overall as 220 which is also arranged on the tool carriage 156 is provided and can be coupled by means of a coupling 224 on the output side to the tool spindle 218, wherein the coupling 224 has a first coupling element 226 arranged on the output side of the tool drive 220 and a coupling element 228 arranged on the input side of the tool spindle 218, which can be brought out of engagement by a radial movement transversely to a common rotation axis 232.

Figure 16:
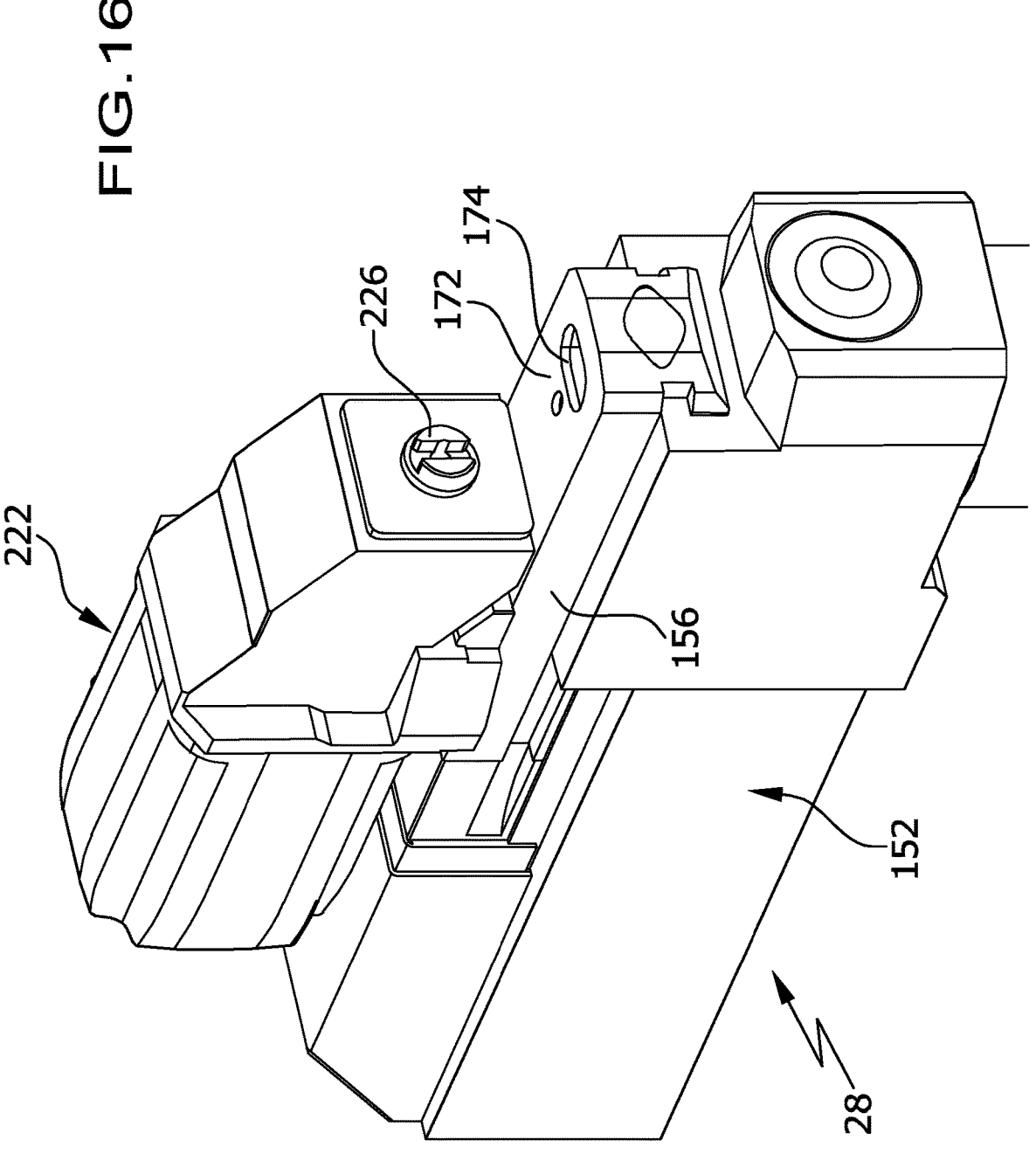
FIG. 16 is a perspective view of the tool drive with the coupling element associated therewith mounted on the tool carriage of the tool carrier.

For example, the coupling element 228 is configured as a blade which can be brought into engagement with the coupling element 226 configured as a blade receptacle in order to couple the tool spindle 218 to the drive 222 (FIGS. 14, 16).

In order to orient the coupling elements 226 and 228 so that they can be brought, through a movement of the tool holder 212 by means of the handling apparatus 60 parallel to the inserting direction 178 of the fixing body 176, into engagement in the fixing receptacle 174, the tool drive 220 is configured as a rotational position-controllable drive, so that the coupling elements 226 and 228 can be oriented parallel to the inserting direction of the fixing body 176 in the fixing receptacle 174.

Figure 17:
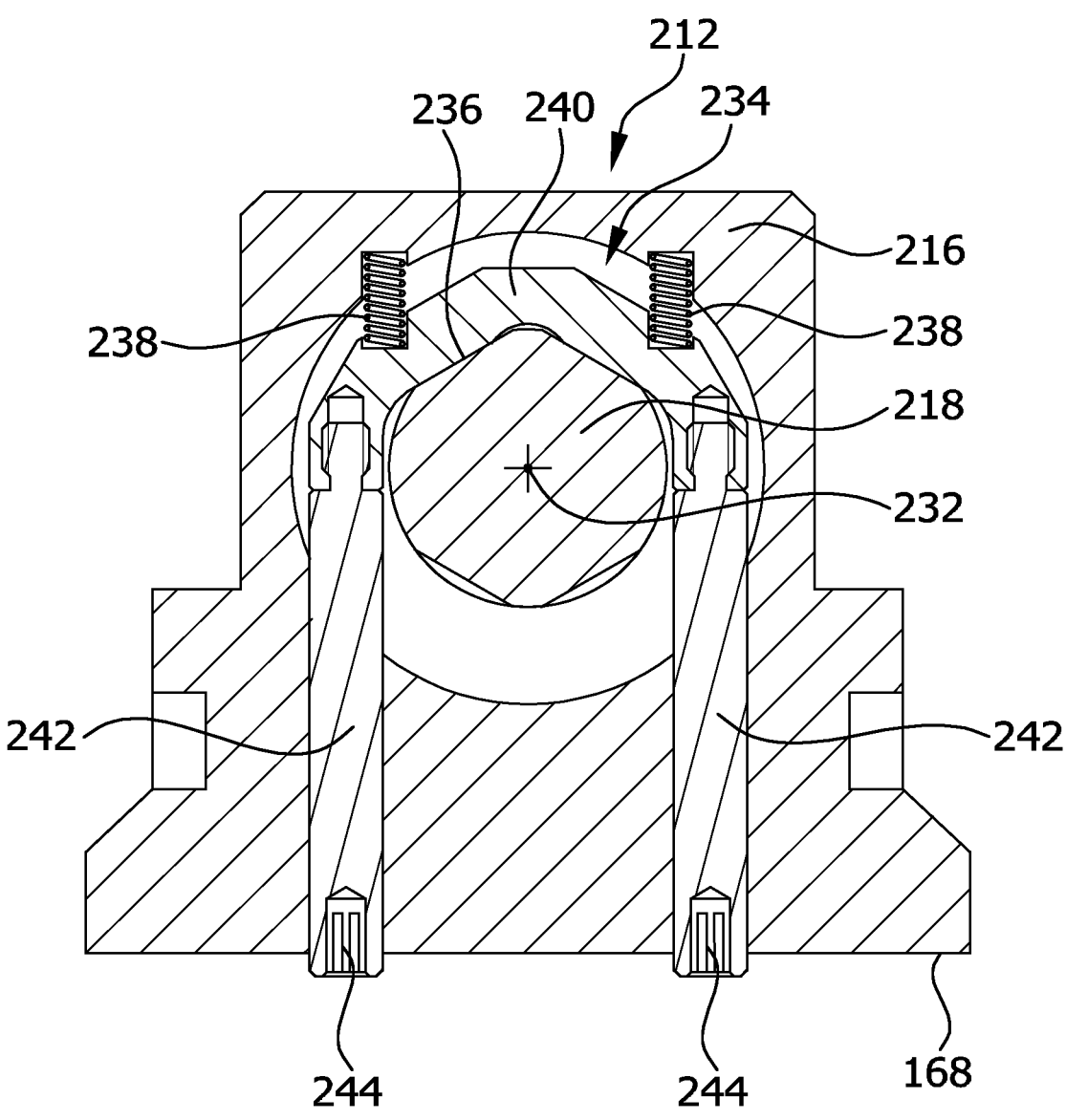
FIG. 17 is a section along the line 17-17 through the tool holder in FIG. 14.

In order to maintain this orientation during removal and reinsertion of the tool holder 212 with respect to the rotational position of the tool spindle 218, provided in the tool holder body 216 is a rotary fixing 234 which can, for example, fix the tool spindle 218 in a region 236 that deviates from a rotational symmetry about the rotation axis 232 thereof, impinged upon by resilient elements 238, wherein this is achieved, for example, by a U-shaped clip 240 which is adapted to the outer shape of the region 236 such that the tool spindle 218 is fixable in just two positions offset by 180° from one another (FIG. 17).

The releasing of the rotary fixing 234 takes place by means of probes 242 acting upon the clip 240, said probes resting, on insertion of the tool holder body 216 into the tool holder receptacle 92, with the probe faces 244 on the contact side 172 and in this case act upon the clip 240 against the force of the resilient elements 238 and thereby release the rotary fixing of the tool spindle 218.

After a machining process, the orientation of the tool spindle 218 takes place by actuating the drive 222 such that said tool spindle is again in the position fixable by the rotary fixing 234 and thereby the coupling elements 226 and 228 can come out of engagement when the tool holder 212 is removed by a movement opposed to the inserting direction 178 by means of the handling apparatus 60.

Figure 18:
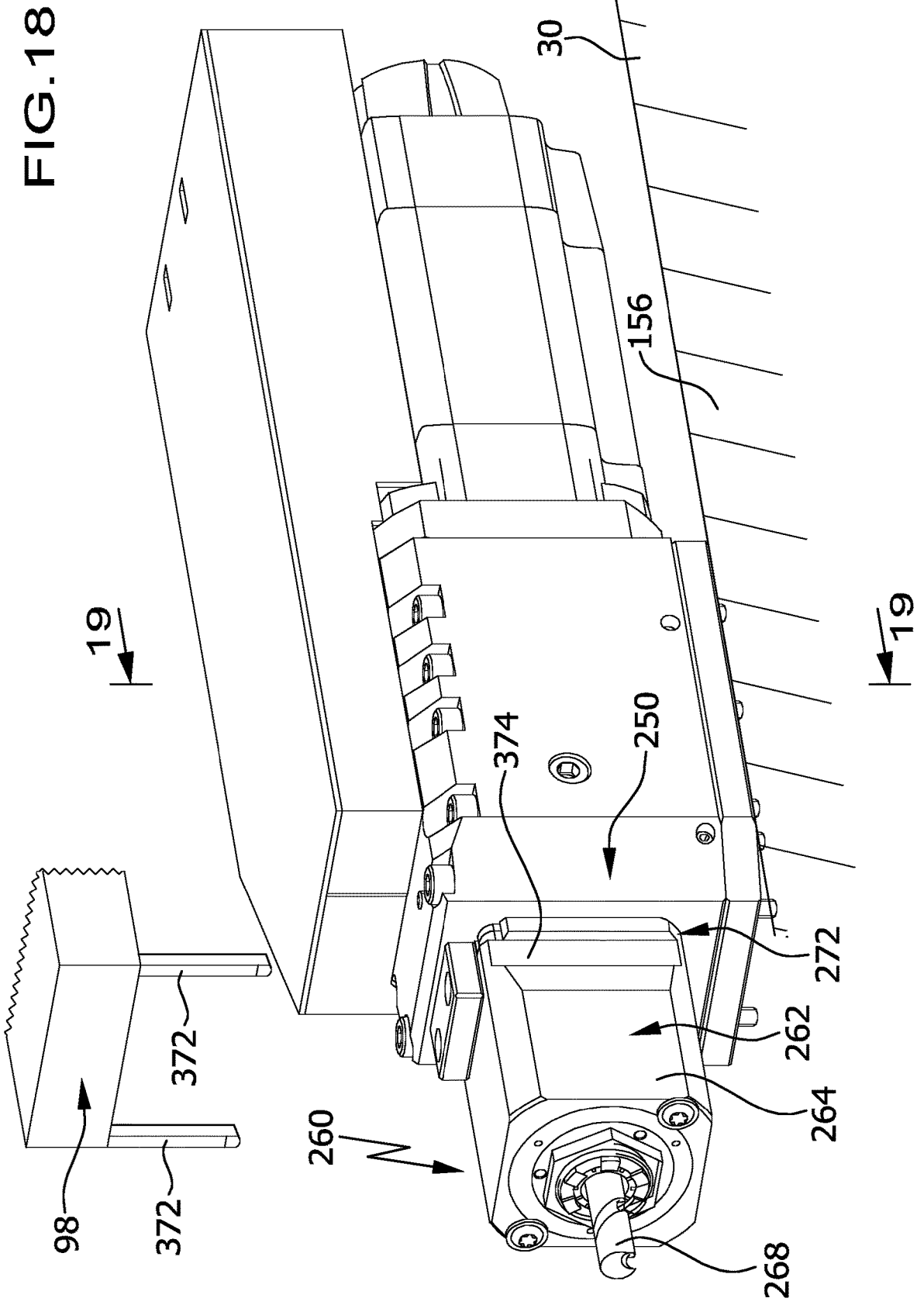
FIG. 18 is a perspective view of a workpiece holder unit mounted on the tool carriage for receiving a further example of a tool holder.

In a further exemplary embodiment of a machine tool according to the invention, on the tool carriage system 30 as a further example of the tool holder receptacle 92, a tool holder receptacle unit identified overall as 250 is provided which is firmly mounted on the tool carrier carriage system 30 (FIG. 18).

Figure 19:
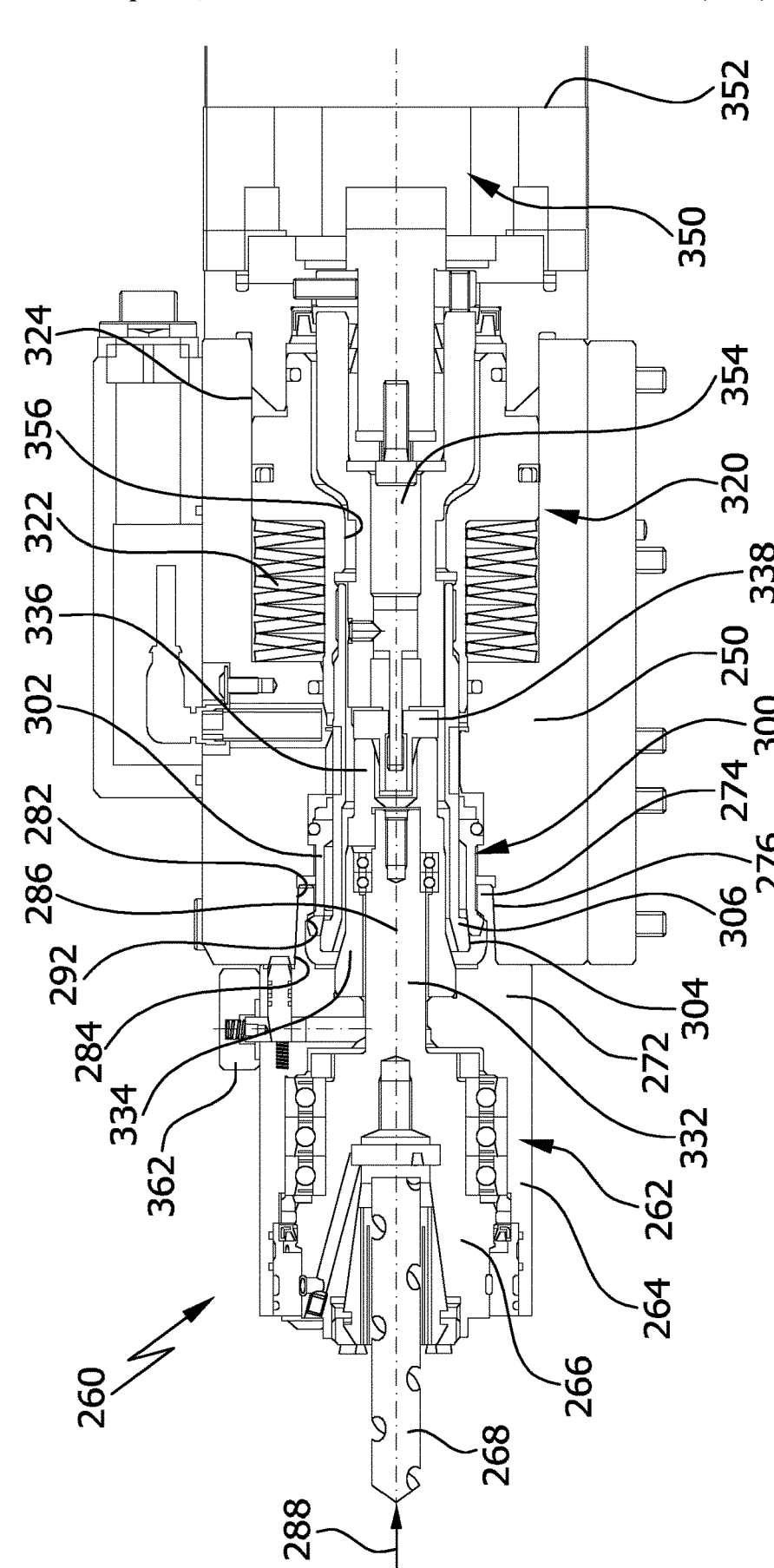
FIG. 19 is a longitudinal section through the tool holder receptacle unit with an inserted and fixed powered tool holder.

As a further example for a tool holder 90, a tool holder identified overall as 260 is insertable into the tool holder receptacle unit 250, said tool holder having, in the first place, a tool holder housing 262 which comprises a tool holder body 264, wherein rotatably mounted in the tool holder body 264 as a tool receptacle element is a tool spindle 266 which carries a tool 268 (FIG. 19).

The tool holder housing 262 therein has a tool holder mounting body 272 on which is arranged a hollow-shaft cone 272 which in turn has a radially externally positioned conical surface 276 and is thus insertable into a conical receptacle 282 of the tool holder receptacle unit 250, which has a radially internal conical surface 284.

In the state inserted into the conical receptacle 282, a conical axis of the hollow-shaft cone 272 and a conical axis of the conical receptacle 282 coincide to form a common conical axis 286 which also defines an inserting direction 288 for the insertion of the tool holder 260 into the tool holder receptacle unit 250.

In order to fix the tool holder mounting body 272 in the region of the hollow-shaft cone 274, it is provided with a radially internal clamping contour 292 with which a clamping unit 300 provided in the tool holder receptacle unit 250 cooperates, said clamping unit being configured such that it is capable of drawing in the hollow-shaft cone 274 into the conical receptacle 282 so far that a radial tensioning occurs between the conical surface 276 of the hollow-shaft cone 274 and the conical surface 284 of the conical receptacle 282 and thus the tool holder 260 can be fastened in the tool holder receptacle unit 250.

The clamping unit 300 preferably has a gripper finger set 302 to which a clamping conical surface 304 positioned internally radially to the gripper finger set 302 can be applied and which is arranged on a clamping sleeve 306 arranged, for example, radially within the gripper finger set 302.

Therein, the clamping sleeve 306 is arranged movable parallel to the conical axis 286.

By means of the movement of the clamping sleeve 306 parallel to the conical axis 286, the gripper finger set 302 can be applied such that it cooperates with the clamping contour 292 of the hollow-shaft cone 274.

The hollow-shaft cone 274, the conical receptacle 282 as well as the clamping unit 300 and the clamping contour 292 form the fixing device 180.

For actuating the clamping unit 300, in particular the clamping sleeve 306 thereof, a clamping actuating unit 320 which is coupled to the clamping sleeve 306 and is driven by the machine control system 80 is provided.

Therein, the clamping actuating unit 320 has, firstly, a spring assembly 322 and, secondly, a hydraulic cylinder unit 324, wherein for example, the spring assembly 322 acts upon the hydraulic cylinder unit 324 such that without activation of the hydraulic cylinder unit 324, the clamping sleeve 306 spreads the gripper finger set 302 such that, cooperating with the clamping contour 292, it draws the hollow-shaft cone 274 into the conical receptacle 282 in the manner described.

The hydraulic cylinder unit 324 is therein operable by means of the machine control system 80, in order, by activating the hydraulic cylinder unit 324 with hydraulic medium, to counteract the spring assembly 322 and thus thereby to act upon the clamping unit 300 such that the gripper finger set 302 transitions into its position releasing the hollow-shaft cone 274, so that the tool holder 260 can be removed from the tool holder receptacle unit 250.

To actuate the tool spindle 266, the tool spindle 266 is provided with a tool drive shaft 332 which penetrates the hollow-shaft cone 274 and is therein mounted rotatably in a guide body 334.

Preferably, the guide body 334 extends radially within the clamping sleeve 306 so that the clamping sleeve 306 is movable independently relative to the guide body 334.

Furthermore, on a side opposite the tool holder housing 262, the tool drive shaft 332 has a coupling element 336 which protrudes beyond the hollow-shaft cone 274 and cooperates with the coupling element 338 of a tool drive which is identified overall as 350 and is actuated by the machine control system 80, said tool drive having, for example, a preferably hydraulically or electrically drivable drive motor 352, the drive shaft 354 of which extends through a radially internal passage 356 of the clamping actuating unit 320 and, on a side of the clamping actuating unit 320 facing away from the tool drive 350, carries the coupling element 338 which cooperates with the coupling element 336 of the tool drive shaft 332 to form a coupling 340 in order to drive the tool 268.

The tool drive 350 can also be actuated by the machine control system 80.

Furthermore, the tool holder housing 262 is also provided with a rotary fixing 362 which has the effect, on removal of the tool holder 260 from the tool holder receptacle unit 250, that the tool spindle 266 or the tool drive shaft 332 are automatically blocked in their rotary position, and therefore fixes the coupling element 336 in the position in which it was removed from the coupling element 338 by a movement coaxially to the drive shaft 354.

If therein the tool drive 350 is simultaneously actuated by the machine control system 80 such that the drive shaft 354 maintains its rotary position, so that the tool holder 260, due to the fixed rotary position of the tool spindle 266 or of the tool drive shaft 332 can be coupled to the drive shaft 354 again, since the rotary position of the coupling elements 336 and 338 was maintained unchanged.

Preferably, with this exemplary embodiment of the tool holder receptacle unit 250 according to the invention, the conical axis 286 extends in the direction from which the tool holder 260 is to be moved on insertion into and removal from the conical receptacle 282 of the tool holder receptacle unit 250 in the inserting direction 288, radially to the spindle axis 24 of the respective workpiece spindle 22 in which a workpiece W is to be machined with the tool 268 of the tool holder 260.

Figure 20:
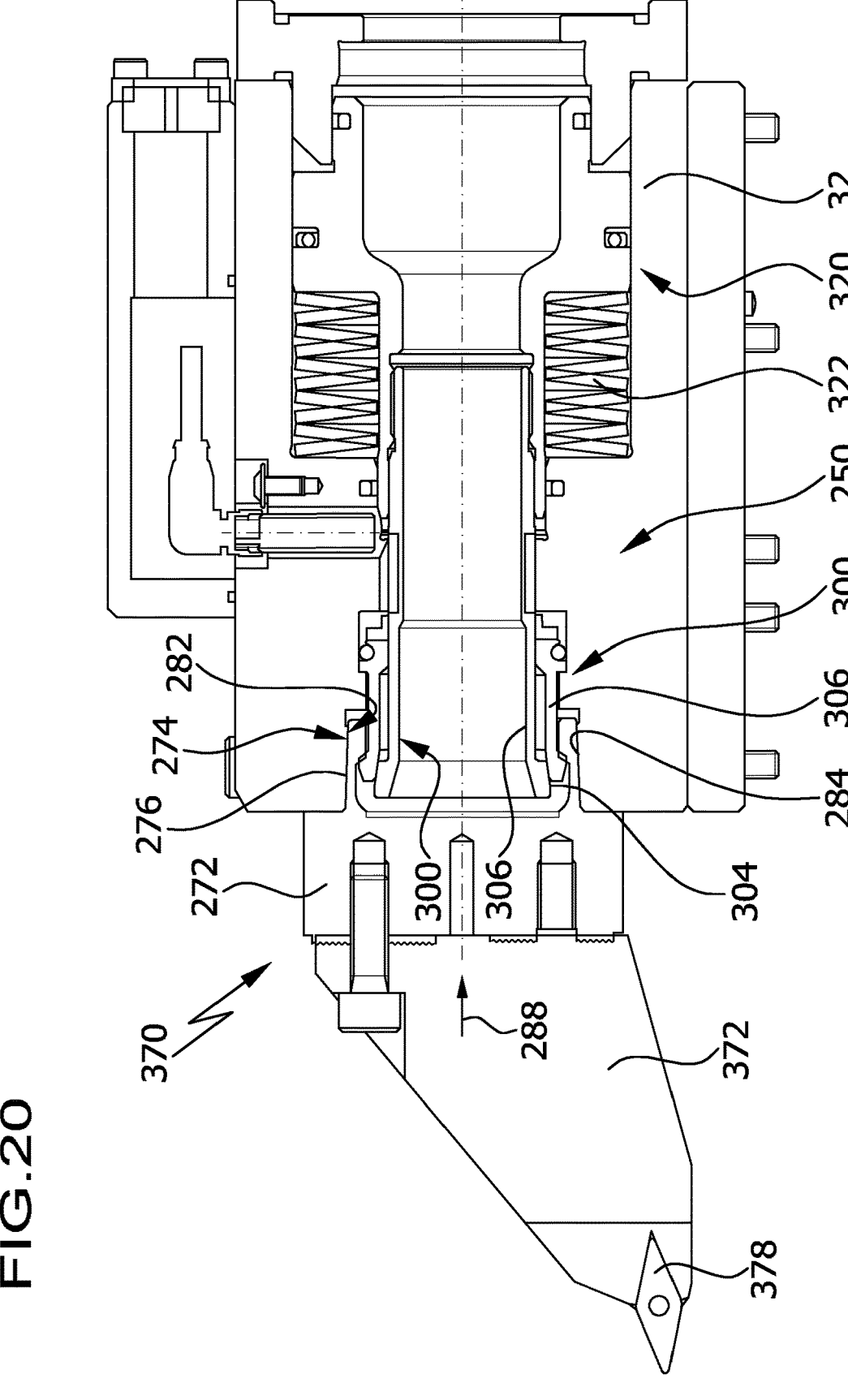
FIG. 20 is a section through the tool holder receptacle unit similar to FIG. 19 with an inserted non-powered tool holder.

Alternatively to the insertion of the tool holder 260 with a rotatingly drivable tool 268, it is however also possible, as shown in FIG. 20 as an example for the tool holder 90, to insert a tool holder 370 with a static tool 378, wherein the hollow-shaft cone 274 can be inserted in the same way into the conical receptacle 282 of the tool holder receptacle unit 250 and can be fixed by means of the clamping unit 300 and the clamping actuating unit 320.

Furthermore, in a tool holder 370 of this type, the tool drive 350 is without effect and is therefore also not rotatingly actuated by the machine control system 80, but is held statically in the prior position.

For exchanging the tool holders 260 and 260', a tool holder gripper 98' is provided which has gripper fingers 372 which engage in gripper grooves 374 of the tool holder housing 262 in order to handle the tool holders 260 or 260' (FIG. 18).

Figure 21:
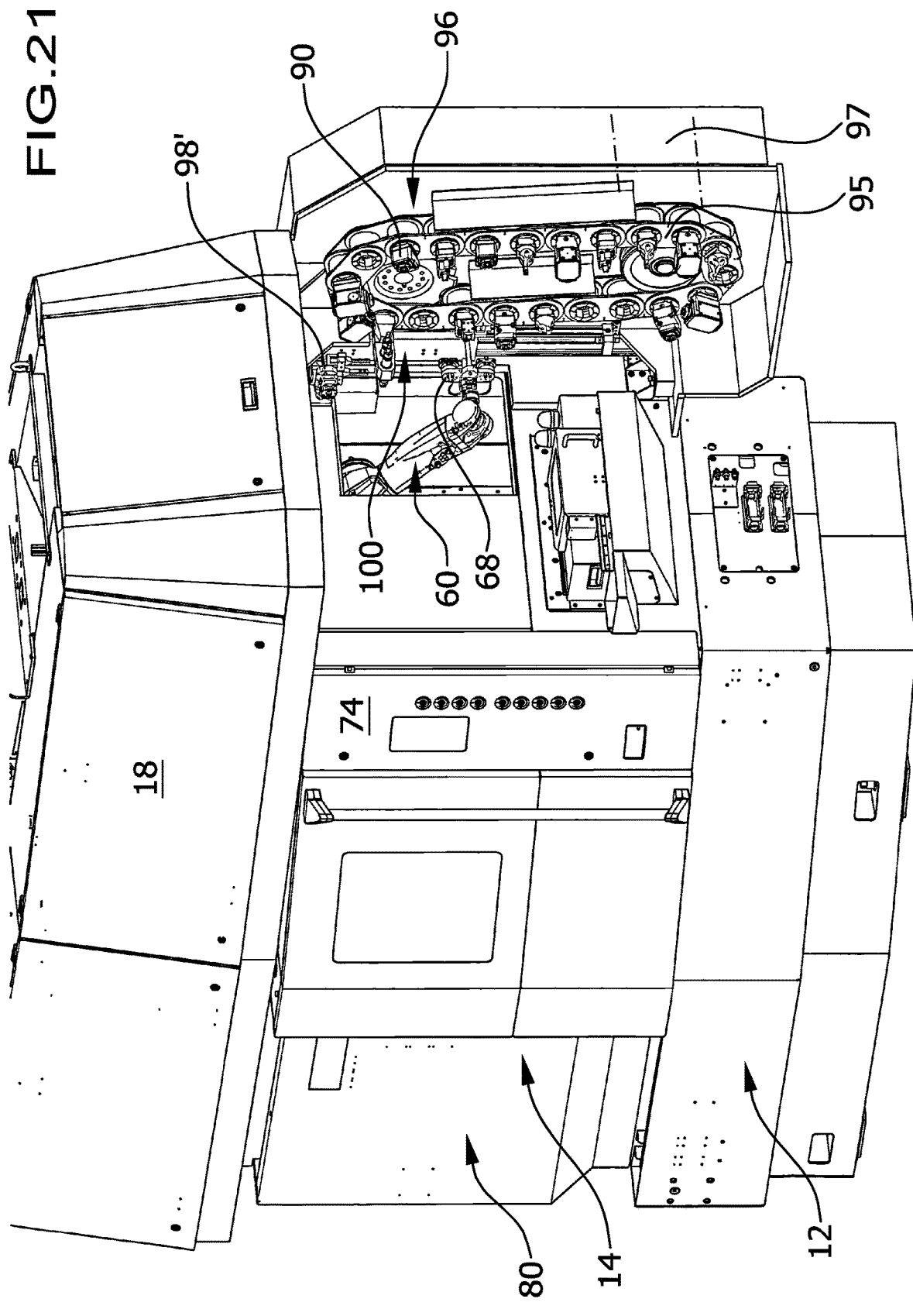
FIG. 21 is an illustration of a machine tool similar to FIG. 8 in relation to the exemplary embodiment of the tool holder described according to FIG. 18.

In this further exemplary embodiment also, as shown in FIG. 21, the gripper store 100 is configured so that, in the first place, it is capable of receiving the tool holder gripper 98' and, in the second place, also the workpiece gripper 68.

Furthermore, the tool holder magazine 96 in which the tool holders 90 are available is provided outside the machine hood 74.

Furthermore, the handling apparatus 60 is configured so that it is capable, in the first place, of exchanging the workpiece gripper 68 and the tool holder gripper 98' with one another.

Figure 22:
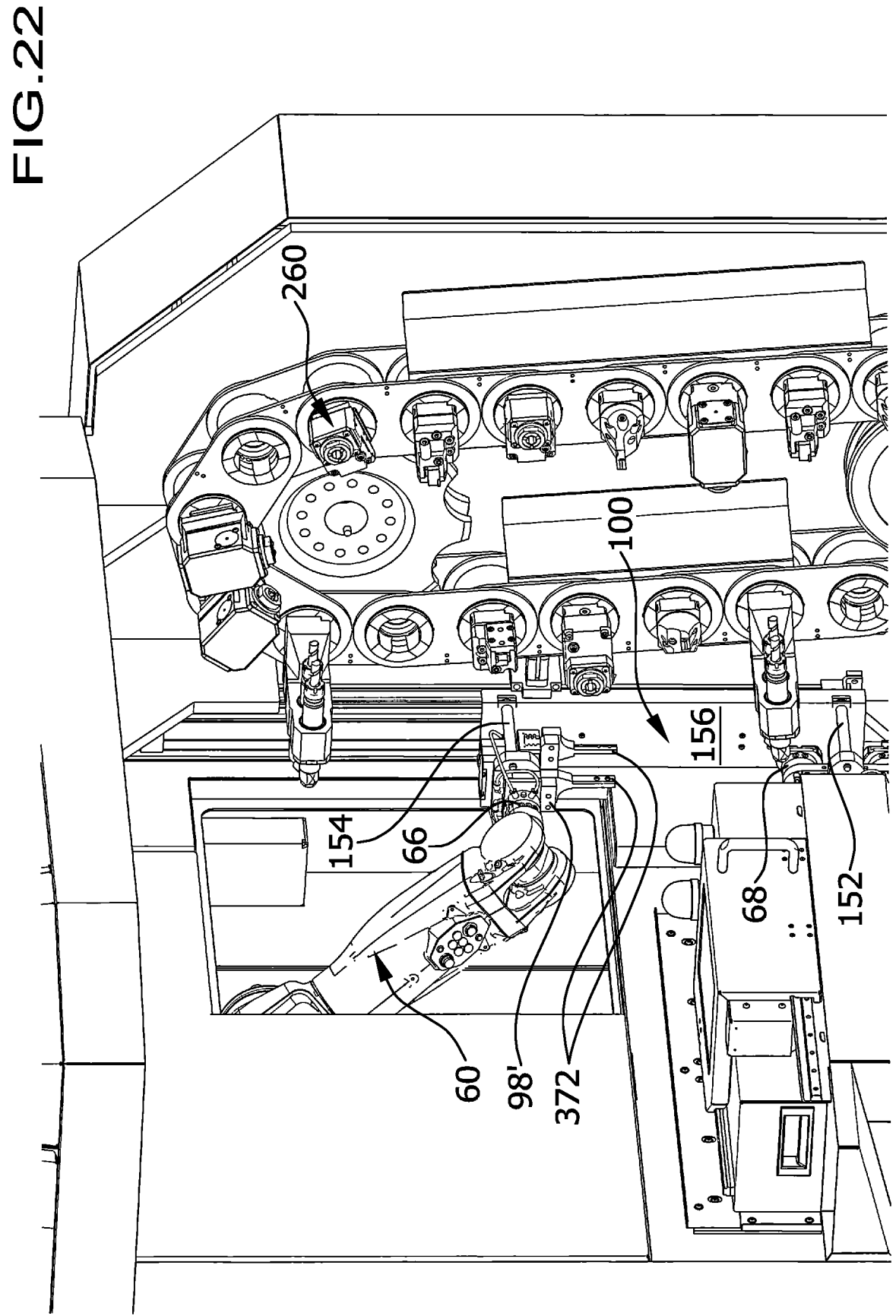
FIG. 22 is an enlarged partial illustration of the tool holder magazine and the tool holder gripper according to FIG. 21.

As FIG. 22 shows, in this exemplary embodiment both the workpiece gripper receptacle 152 and also the tool holder gripper receptacle 154 are arranged on the carriage 156 of the gripper store 100, so that by displacement of the gripper store 100, either the workpiece gripper 68 or the tool holder gripper 98' can be received from the gripper receptacle 66 by the quick change system 110.

The machine tool according to the invention operates under program control by the machine control system 80 as follows.

At the start of a machining of a workpiece W, for example, an unmachined workpiece W is introduced into one of the workpiece spindles 22 standing at a selected spindle station 26 by a workpiece rod pushed through the spindle 22 from a side opposite to the working area 50 until an end of the workpiece rod that is to be machined protrudes beyond the end face of the workpiece spindles 22 for machining.

Then the workpiece rod is clamped in the workpiece receptacle 42 by the workpiece clamping apparatus 44 of this workpiece spindle 22 under program control by means of the machine control system 80.

Alternatively, however, a workpiece W can also be inserted from the side of the working space 50 into the respective workpiece spindle 22 standing in a particular spindle station 26, by means of the handling apparatus 60, wherein for this purpose, the handling apparatus 60 receives, with the gripper receptacle 66, the workpiece gripper 68 in the gripper store 100 and, by means of the workpiece gripper 68, receives the unmachined workpiece W by means of the workpiece gripper 68 from the workpiece feed and/or removal apparatus 72 by clamping with the workpiece gripper 68, introduces it into the working area 50 and, from the side of the working area 50, introduces it into the workpiece receptacle 42 of the workpiece spindle 22 far enough so that the workpiece W can be clamped by means of the workpiece clamping apparatus 44 under program control by the machine control system 80.

Thereafter, a machining of the workpiece W, which is possibly already in the spindle station 26, takes place as specified to the machine control system 80 by a machining program, in which spindle station the insertion of the workpiece W took place and also in subsequent spindle stations 26 through advancing of the spindle drum 16, that is, rotation about the spindle drum axis 20, wherein in each case, machining takes place by means of the tool carrier 28 associated with each spindle station 26.

The insertion of unmachined workpieces W described above can take place in just one of the spindle stations 26, but also for example, in two or more spindle stations 26 in the manner described.

Following machining of the workpiece W, a removal of this workpiece W in the spindle station 26 in which the ready already machined workpiece W is available, from the respective workpiece spindle 22 by means of the workpiece gripper 68 by the handling apparatus 60 takes place, wherein for this purpose, the handling apparatus 60 accesses this workpiece W with the workpiece gripper 68 under program control by the machine control system 80, then grips this workpiece W under program control by the machine control system 80 and, also under program control by the machine control system 80, after the releasing of the workpiece clamping apparatus 44 by the machine control system 80, removes the workpiece W gripped by the workpiece gripper 68 without collisions along a programmed workpiece changing path from the workpiece spindle 22 and transports it without collisions through the working area 50 to the workpiece feed and/or removal apparatus 72 and places it therein as an already machined workpiece W.

In addition, however, with the machine tool 10 according to the invention, a tool 32 can be exchanged by exchanging the tool holder 90 holding this tool 32, for example if the service life of this tool 32 has been exceeded or if a tool breakage has been established or if a retooling is to be undertaken.

For this purpose, the machine control system 80 accesses the gripper store 100 with the handling apparatus 60, places the workpiece gripper 68 therein by releasing the quick change system 100 and grips, for example by displacing the carriage system 156, the tool holder gripper 98 with which the tool holder 90 can be gripped.

Subsequently, for exchanging the tool holder 90 under program control by the machine control system 80, accessing of this tool holder 90 takes place, specifically by moving the tool holder gripper 98 without collisions along a tool holder changing path through the working area 50 and adjoining tool holders 90, which tool holder is received in the respective tool carrier 28 and is to be exchanged.

For this purpose, however, a movement of the carriage system 30 of this tool carrier 28 takes place under program control by the machine control system 80 into a defined tool changing position which is selected by the machine control system 80 or is basically specified to the machine control system 80.

A tool changing position defined in this way is required in order to prevent collisions of the tool of the tool holder 90 to be exchanged with the workpiece W or other tools 32 or tool holders 90 when exchanging the tool holder 90.

In this tool changing position of the carriage system 30, access by the tool holder gripper 98 to the tool holder 90 is then possible and a removal of this tool holder 90 from the respective tool holder receptacle 92 takes place, wherein the removal takes place opposingly to the respective inserting direction which, by way of example, with a tool holder in accordance with the exemplary tool holder 160 or 210, takes place opposingly to the inserting direction 178, wherein the inserting direction 178 extends parallel to the respective spindle axis 24.

In the tool holders 260 and 370 described as examples for a tool holder 90, by contrast, a removal of the respective tool holders 260 and 370 takes place opposingly to the inserting direction 288 which extends transversely, preferably perpendicularly to the respective spindle axis 24.

In this case, the tool changing position of the carriage system 30 is thus to be selected such that no collision of the respective tool 268 or 378 with the workpiece W possibly still in the workpiece spindle 22 takes place and subsequently, in particular after movement of the hollow-shaft cone 274 out of the conical receptacle 282, the corresponding tool holder 260 or 370 can be moved through the working area 50 with a component in the direction of the spindle axis 24.

In order to be able to remove the tool holder 90 to be exchanged from the tool holder receptacle 92, either, for example, in the case of one of the tool holders 160 or 210, the tool holder clamping drive 200 is to be actuated by the machine control system 80 such that the clamping of the tool holder 90 is released or, on insertion of the tool holder 160 or 210, the tool holder clamping drive 200 is to be actuated by the machine control system 80 such that a clamping of the tool holder 160 or 210 takes place.

In the case of one of the tool holders 260 or 370, the clamping actuating unit 320 is to be actuated by the machine control system 80 such that the clamping of the hollow-shaft cone 274 is released in order to be able to remove the tool holder 260 or 370 from the conical receptacle 282 or, on insertion of such a tool holder 260 or 370, specifically before the insertion, the clamping actuating unit 320 is also to be actuated such that the clamping unit 300 is in the non-clamping position and only after insertion of the respective tool holder 260 or 370 is the clamping actuating unit 320 to be actuated such that a clamping of the hollow-shaft cone 274 by the clamping unit 300 takes place, for example, by means of the spring assembly acting upon the clamping unit 322.

Thereafter, a placement of this tool holder 90 in the tool holder magazine 96 takes place, also under program control by the machine control system 80, and a subsequent, also program-controlled, receiving of a replacement tool holder 90 and a program-controlled insertion of this replacement tool holder 90 into the tool holder receptacle 92 from which the tool holder 90 was removed with the tool 32 to be replaced. Herein, the tool holder gripper 98 is moved under program control by the machine control system 80 by means of the handling apparatus 60 along the tool holder changing path without collisions through the working area 50 and to adjacent tool carriers 28 and tool holders 90 as far as into the tool holder receptacle 92 standing in the tool changing position and is placed therein.

Both in the movement of the tool holder gripper 98 to the tool holder 90 to be replaced and standing in the tool changing position as well as in the moving-out of the tool holder 90 to be replaced by means of the tool holder gripper 98 and also for renewed exchanging of a tool holder 90 to be exchanged into the tool holder receptacle 92 of the carriage system 30 standing in the tool changing position, the handling apparatus 60 is to be controlled by the machine control system 80 such that the tool holder gripper 98 can move with the respective tool holder 90 without collisions, in the first place, through the working area 50 and, in the second place, as far as into the tool holder receptacle 92 of the carriage system 30 standing in the tool changing position.

A workpiece changing path as described above or a tool holder swapping and exchanging path, referred to for simplicity as a tool holder changing path, is to be carried out by the machine control system 80 under program control for each tool holder 90 to be exchanged and is thus to be recorded for the machine control system 80 in advance, in order to prevent any collisions in the working area 50 with components of the machine tool, in particular also collisions with workpieces W and other inserted tool holders 90.

Such a storage of the workpiece changing path and/or the tool holder changing path that is to be followed by the workpiece gripper 68 with or without a gripped workpiece W or by the tool holder gripper 98 without or without a tool holder 90 gripped thereby, is either to be stored by precise manual programming of the machine control system 80 taking account of the overall configuration of the machine tool 10 or is to be stored in the machine control system 80 or by a learning process to be performed manually that is to be undertaken for each workpiece W to be changed in the respective workpiece spindle 22 and/or for each tool holder 90 to be exchanged in the respective tool holder receptacle 92, in respect of the movement of the workpiece gripper 68 or the tool holder gripper 98 with and without the tool holder 90.

The invention claimed is:

1. A multi-spindle machine tool comprising a machine frame, a spindle drum arranged on the machine frame to be rotatable about a spindle drum axis and having a plurality of workpiece spindles, each of which is provided with a workpiece receptacle for a workpiece that is to be machined in a working area, a plurality of tool carriers arranged in the working area, associated with individual spindle stations, and each tool carrier having a tool holder receptacle into which a tool holder is insertable, thereby providing a plurality of tool holder receptacles and a plurality of tool holders, and a machine control system for controlling the machine tool, wherein a handling apparatus is arranged on the machine frame, wherein with the handling apparatus, also controlled by the machine control system, at least one of the tool holders is at least one of i) insertable into at least one of the tool holder receptacles and ii) removable therefrom, further comprising a tool holder magazine, wherein the machine control system controls the handling apparatus to insert the tool holders into the tool holder magazine or remove therefrom, wherein the tool holder magazine has a magazine element for receiving the tool holders, said magazine element being movable by a drive, and wherein the machine control system controls the drive, and wherein the tool holder magazine is arranged outside the working area.

2. The machine tool in accordance with claim 1, wherein the handling apparatus is configured as a multi-axis handling apparatus.

3. The machine tool in accordance with claim 1, wherein the handling apparatus is configured so that it can access the tool holder receptacles for at least one of inserting and removing a tool holder.

4. The machine tool in accordance with claim 1, wherein the handling apparatus is configured so that it can access the tool holder receptacles associated with a plurality of spindle stations for at least one of inserting and removing a tool holder.

5. The machine tool in accordance with claim 1, wherein the handling apparatus travels with a movement component parallel to the workpiece spindle axes when at least one of inserting and removing the respective tool holder in the working area.

6. The machine tool in accordance with claim 1, wherein the handling apparatus travels in from a side of the working area facing away from the spindle drum into the working area for at least one of inserting and removing the respective tool holder.

7. The machine tool in accordance with claim 1, wherein the tool holder is insertable into the respective tool holder receptacle in an inserting direction extending approximately parallel to the spindle drum axis.

8. The machine tool in accordance with claim 1, wherein the tool holder is insertable into the tool holder receptacle in an inserting direction extending transversely to the spindle drum axis, said inserting direction extending, away from the spindle drum axis.

9. The machine tool in accordance with claim 1, wherein a fixing device for fixing the tool holder in the tool holder receptacle is controllable with the machine control system.

10. The machine tool in accordance with claim 9, wherein to form the fixing device, the tool holder receptacle and the tool holder have cooperating positively-locking elements, which are configured to be brought into engagement in a positively-locking manner on insertion of the tool holder into the tool holder receptacle.

11. The machine tool in accordance with claim 10, wherein each tool carrier has a tool carriage with a fixing receptacle extending thereinto, into which a fixing body of the tool holder is insertable by moving it in an inserting direction and is fastenable in an inserted state by fixing it in the fixing receptacle by a positively-locking element.

12. The machine tool in accordance with claim 11, wherein the positively-locking element is a fixing wedge body which is movable in the tool carriage in a movement direction extending transversely to the inserting direction between a releasing position and a fixing position and wherein in the fixing position, the fixing wedge body cooperates with a wedge receptacle of the fixing body.

13. The machine tool in accordance with claim 12, wherein the fixing wedge body is guided in a linearly movable manner in the tool carriage and acts with a wedge face on a wedge face of the wedge receptacle of the fixing body.

14. The machine tool in accordance with claim 13, wherein the fixing wedge body is movable between the fixing position and the releasing position by way of a drive controlled by the machine control system.

15. The machine tool in accordance with claim 1, wherein each tool carrier has a tool carriage with a tool holder receptacle into which the tool holder is insertable in an inserting direction which lies in a plane extending transversely to the workpiece spindle axis.

16. The machine tool in accordance with claim 15, wherein the tool holder has a hollow-shaft cone which is insertable into the tool holder receptacle having a conical receptacle.

17. The machine tool in accordance with claim 16, wherein the hollow-shaft cone has a clamping contour with which a clamping unit of the tool holder receptacle cooperates.

18. The machine tool in accordance with claim 17, wherein the clamping unit is configured to be acted upon by a clamping actuating unit controlled by the machine control system in the direction of its clamping position in which it clampingly fixes the hollow-shaft cone.

19. The machine tool in accordance with claim 16, wherein in the clamping position, the clamping unit draws the hollow-shaft cone in the direction of the conical axis into the conical receptacle and presses it radially to the conical axis against the conical receptacle.

20. The machine tool in accordance with claim 1, wherein each tool carrier has a tool carriage, wherein arranged stationary on the tool carriage is a tool drive controlled by the machine control system, with which a tool spindle which is rotatably mounted in the tool holder is drivable.

21. The machine tool in accordance with claim 20, wherein the tool drive is configured to be coupled by a coupling to the tool spindle.

22. The machine tool in accordance with claim 21, wherein the coupling has coupling elements configured to be brought into engagement when the tool holder is inserted into the tool holder receptacle.

23. The machine tool in accordance with claim 22, wherein one of the coupling elements has a coupling receptacle extending transversely to the rotation axis and the other of the coupling elements has an engagement for the coupling receptacle extending transversely to the rotation axis.

24. The machine tool in accordance with claim 20, wherein the tool holder is provided with a rotary fixing for rotationally fixed securing of the rotatable tool spindle.

25. The machine tool in accordance with claim 24, wherein with the tool holder fixed in the tool holder receptacle, the rotary fixing is automatically in an inactive position and, on release of the fixed tool holder, automatically transfers into an active rotation-fixing position.

26. The machine tool in accordance with claim 1, wherein the spindle axes of the workpiece spindles are oriented parallel to the spindle drum axis.

27. The machine tool in accordance with claim 1, wherein the tool carriers are associated with spindle stations in which the workpiece spindles are positionable for machining the workpieces held in the workpiece receptacles.

28. The machine tool in accordance with claim 1, wherein at least one of the tool carriers has a tool carriage system which carries the tool holder receptacle and is controlled by the machine control system.

29. The machine tool in accordance with claim 28, wherein the tool carriage system has tool carriages movable at least in an X-machining direction relative to the workpiece spindle.

30. The machine tool in accordance with claim 1, wherein the handling apparatus has a gripper receptacle, by which the handling apparatus can receive a tool holder gripper, wherein the machine control system controls of the tool holder gripper.

31. The machine tool in accordance with claim 30, wherein the tool holder gripper is placeable in a tool holder gripper receptacle of a gripper store.

32. The machine tool in accordance with claim 31, wherein the gripper store is arranged outside the working area.

33. The machine tool in accordance with claim 31, wherein the machine control system detects the tool holder gripper on the basis of its position in the gripper store.

34. The machine tool in accordance with claim 30, wherein the machine control system detects whether the tool holder gripper is received in the gripper receptacle of the handling apparatus.

35. The machine tool in accordance with claim 34, wherein the machine control system detects a code on the tool holder gripper.

36. The machine tool in accordance with claim 1, wherein by way of the handling apparatus provided on the machine frame, handling apparatus workpieces are at least one of i)

insertable, controlled by the machine control system, into at least one of the workpiece spindles and ii) removable therefrom.

37. The machine tool in accordance with claim 36, wherein the machine control system controls the handling apparatus during a workpiece change.

38. The machine tool in accordance with claim 36, wherein the handling apparatus has a gripper receptacle, by which the handling apparatus can receive a workpiece gripper.

39. The machine tool in accordance with claim 38, wherein the workpiece gripper is placeable in a workpiece gripper receptacle of a gripper store.

40. The machine tool in accordance with claim 39, wherein the gripper store is arranged outside the working area.

41. The machine tool in accordance with claim 38, wherein the machine control system detects whether the workpiece gripper is received in the gripper receptacle of the handling apparatus.

42. The machine tool in accordance with claim 41, wherein the machine control system detects a code on the workpiece gripper.

43. The machine tool in accordance with claim 1, wherein the machine control system detects the workpiece gripper on the basis of its position in the gripper store.

44. A multi-spindle machine tool comprising a machine frame, a spindle drum arranged on the machine frame to be rotatable about a spindle drum axis and having a plurality of workpiece spindles, each of which is provided with a workpiece receptacle for a workpiece that is to be machined in a working area, a plurality of tool carriers arranged in the working area, associated with individual spindle stations, and each tool carrier having a tool holder receptacle into which a tool holder is insertable, thereby providing a plurality of tool holder receptacles and a plurality of tool holders, and a machine control system for controlling the machine tool, wherein a handling apparatus is arranged on the machine frame, wherein with the handling apparatus, also controlled by the machine control system, at least one of the tool holders is at least one of i) insertable into at least one of the tool holder receptacles and ii) removable therefrom, wherein each tool carrier has a tool carriage with a tool holder receptacle into which the tool holder is insertable in an inserting direction which lies in a plane extending transversely to the workpiece spindle axis, wherein the tool holder has a hollow-shaft cone which is insertable into the tool holder receptacle having a conical receptacle, and wherein in the clamping position, the clamping unit draws the hollow-shaft cone in the direction of the conical axis into the conical receptacle and presses it radially to the conical axis against the conical receptacle.

\* \* \* \* \*